United States Patent
Oba et al.

(10) Patent No.: US 9,526,040 B2
(45) Date of Patent: Dec. 20, 2016

(54) DATA TYPE ENCODING FOR MEDIA INDEPENDENT HANDOVER

(75) Inventors: Yoshihiro Oba, Englewood Cliffs, NJ (US); Subir Das, Belle Mead, NJ (US); Yuu-Heng Alice Cheng, Piscataway, NJ (US); Miriam Tauil, Berkeley Heights, NJ (US); Kenichi Taniuchi, Kawasaki (JP)

(73) Assignees: TOSHIBA AMERICA RESEARCH, INC., Washington, DC (US); TELCORDIA TECHNOLOGIES, INC., Piscataway, NJ (US)

( * ) Notice: Subject to any disclaimer, the term of this patent is extended or adjusted under 35 U.S.C. 154(b) by 1193 days.

(21) Appl. No.: 12/119,048

(22) Filed: May 12, 2008

(65) Prior Publication Data
US 2009/0047959 A1 Feb. 19, 2009

Related U.S. Application Data

(60) Provisional application No. 60/917,549, filed on May 11, 2007.

(51) Int. Cl.
*H04W 36/00* (2009.01)
*H04W 80/04* (2009.01)

(52) U.S. Cl.
CPC ....... *H04W 36/005* (2013.01); *H04W 36/0011* (2013.01); *H04W 80/04* (2013.01)

(58) Field of Classification Search
CPC .................................................. H04W 36/005
See application file for complete search history.

(56) References Cited

U.S. PATENT DOCUMENTS

| 2003/0002525 | A1  | 1/2003 | Grilli et al. |
| 2004/0064587 | A1* | 4/2004 | Leung ............................ 709/246 |
| 2006/0052108 | A1  | 3/2006 | Laroia et al. |
| 2006/0227747 | A1* | 10/2006 | Kim et al. ..................... 370/331 |
| 2006/0264207 | A1* | 11/2006 | Tamura et al. ............... 455/415 |
| 2006/0276192 | A1  | 12/2006 | Dutta et al. |
| 2008/0008131 | A1* | 1/2008 | Watfa et al. ................... 370/331 |

OTHER PUBLICATIONS

Yeongmoon Son "The unified TLV encoding for DCD and UCD in OFDMA PHY mode" published Nov. 1, 2004.*
X.690 published Jul. 2002 by Telecommunication standardization sector of ITU.*
International Search Report, Jun. 11, 2009, p. 1-7.
European Search Report dated Jun. 24, 2011, issued in corresponding European Patent Application No. 08754384.9.
"Information technology—ASN. 1 encoding rules: Specification of Packed Encoding Rules (PER); X.691(Jul. 2002)" ITU-T Standard, International Telecommunication Union, Geneva; CH., No. X.691 (Jul. 2002), Jul. 14, 2002, pp. 1-56, XP017434544.(cited in European Search Report dated Jun. 24, 2011).
Chinese Office Action dated Dec. 21, 2011, issued in corresponding Chinese Patent Application No. 200880023800.8.

(Continued)

*Primary Examiner* — Justin Lee
(74) *Attorney, Agent, or Firm* — Westerman, Hattori, Daniels & Adrian, LLP

(57) ABSTRACT

A method of employing an encoding scheme for media independent handover, comprising: having at least some data type carry only required information to determine the end of data without a length value.

19 Claims, 13 Drawing Sheets

(56) References Cited

OTHER PUBLICATIONS

European Office Action dated Feb. 28, 2012, issued in corresponding European Patent Application No. 08754384.9 (3 pages).
Japanese Office Action dated Apr. 17, 2012, issued in corresponding Japanese Patent Application No. 2010-508391; 5 pages with partial english translation.
Vivek Gupta, Media Independent Handover Service, Draft Technical Requirements, IEEE, Sep. 2004 (21-04-0087-12-0000)(11 pages).
Canadian Office Action dated Jul. 12, 2012, issued in corresponding Canadian Patent Application No. 2,686,625 (3 pages).
Chinese Office Action dated Oct. 10, 2012, issued in correspomnding Chinese Patent Application No. 200880023800.8, with English translation (9 pages).
Canadian Office Action dated Jan. 9, 2014, issued in corresponding Canadian Patent Application No. 2,686,625(2 pages).
European Communication pursuant to Article 94(3) EPC dated Mar. 25, 2014, issued in European Patent Application No. 08754384.9 (3 pages).
Communication Pursuant to Article 94(3) EPC dated Oct. 17, 2014, corresponds to European Patent Application No. 08754384.9 (4 pages).
European Office Action dated Sep. 24, 2013 in corresponding European Application No. 08 754 384.9.
Chinese Office Action dated Jun. 9, 2013, issued in correspomnding Chinese Patent Application No. 200880023800.8, w/ English translation.

* cited by examiner

FIG. 1

Basic Data Types

| Type Name | Definition | Range | Binary Encoding Rule |
|---|---|---|---|
| LIST(*DATATYPE*) | A list of values of type *DATATYPE*. | N/A | See Annex M.1.1. |
| SEQUENCE(*DATATYPE1,DATATYPE2*[,...]) | A data type that consists of two or more data types. | N/A | *DATATYPE1,DATATYPE2*[,...] are encoded in the order of appearance. Each data type is encoded using the encoding rule for the data type. |
| CHOICE(*DATATYPE1,DATATYPE2*[,...]) | A data type that consists of only one of the data types listed: *DATATYPE1,DATATYPE2*[,...]). | N/A | A one-octet Selector field, followed by a variable length Value field. The Selector value determines the data type. If Selector=i, (i+1)-th data type in the list of data types *DATATYPE1,DATATYPE2*[,...] is selected. The Value field is encoded using the encoding rule for the selected data type. |
| NULL | A data type with an empty data. | N/A | No octet is encoded for this data type. This data type is used for to define an optional data type. |
| BITMAP(size) | A bitmap of the specified size in number of bits. | Each bit has a value of '0' or '1'. | Each bit of a BITMAP(N) value [N=8*i, i=1, 2, ...] is encoded as an N/8-octet value in order of significance. |
| INTEGER(size) | An integer of the specified size in number of octets. | Each octet has a value of 0x00 to 0xff. | Each octet of an INTEGER(N) value [N=1,2,...] is encoded in network-byte order into an N-octet field. |
| CHAR(size) | An array of 8-bit characters with the specified number of octets. | N/A | Each character is encoded in order of appearance where each bit of each character is encoded in order of significance. |
| INFORMATION_ELEMENT | A binary encoded structure for information elements (e.g., as defined in Section 6.4.6). | N/A | See Section 6.4.6. |
| UNSIGNED INTEGER(size) | An unsigned integer of the specified size in number of octets. | Each octet has a value of 0x00 to 0xff | Each octet of an UNSIGNED_INT(N) value [N=1,2,...] is encoded in network-byte order into an N-octet field. |

FIG. 2

| LIST(LINK_ID) (29-octet) | | | | | | | | |
|---|---|---|---|---|---|---|---|---|
| Length (1-octet) | Value (28-octet) | | | | | | | |
| 2 | | LINK_ID (14-octet) | | | | LINK_ID (14-octet) | | |
| | | LINK_TYPE (type:INTEGER(4)) (4-octet) | MAC_ADDRESS (type:OCTET_STRING =LIST(CHAR(1)) (10-octet) | | | LINK_TYPE (type:INTEGER(4)) (4-octet) | MAC_ADDRESS (type:OCTET_STRING =LIST(CHAR(1)) (10-octet) | |
| | | | Length (1-octet) | Value (9-octet) | | | Length (1-octet) | Value (9-octet) |
| | | 19 (802.11) | 9 | 2-octet address family followed by 6-octet IEEE MAC address | | 27 (802.16) | 9 | 2-octet address family followed by 6-octet IEEE MAC address. |

FIG. 3

Example Derived Types :
General Purpose

| Type Name | Derived From | Definition | Valid Range |
|---|---|---|---|
| ENUMERATED | INTEGER(1) | A type to represent an enumerated attribute. | 0 - 255 |
| BOOLEAN | ENUMERATED | A type to represent a Boolean attribute. | 0 : False, 1 : True |
| MIME_TYPE | OCTET_STRING | A type to represent a MIME type. When the MIME type is "application/ sparql-results+xml", this field contains XML text. | N/A |
| OCTET_STRING | LIST(CHAR(1)) | A type to represent an array of octets. | N/A |
| PERCENTAGE | INTEGER(1) | A type to represent a percentage. | 0 - 100 |
| STATUS | ENUMERATED | A type to represent a status of a primitive execution. | 0 Success<br>1 Unspecified Failure<br>2 Rejected<br>3 Authorization Failure<br>4 Network Error |

FIG. 4

Example Derived Types : Addresses

| Type Name | Derived From | Definition | Valid Range |
|---|---|---|---|
| TRANSPORT_ADDRESS | OCTET_STRING | A type to represent a transport address using Address base type defined in RFC3588. The First 2-octet contains AddressType. | AddressType values are defined in http://www.iana.org/assignments/address-family-numbers. |
| MAC_ADDRESS | TRANSPORT_ADDRESS | A type to represent a MAC address. | The AddressType contains the one used for a specific link layer. |
| IP_ADDRESS | TRANSPORT_ADDRESS | A type to represent an IP address. | The AddressType contains either 1 (IPv4) or 2 (IPv6). |

FIG. 5

Example Derived Types :
Link Identification

| Type Name | Derived From | Definition | Valid Range |
|---|---|---|---|
| LINK_ID | SEQUENCE( LINK_TYPE MAC_ADDRESS) | A type to represent the identifier of a link that is not associated with any PoA. The MAC_ADDRESS contains a MAC address of MN. This may be used for the link currently being used by MN or the link that was used before handover. | N/A |
| LINK_TUPLE_ID | SEQUENCE( LINK_ID, CHOICE( MAC_ADDRESS, NULL)) | A type to represent the identifier of a link that may be associated with a PoA. The optional MAC_ADDRESS contains a MAC address of PoA. | N/A |
| LINK_POA_LIST | SEQUENCE( LINK_ID, LIST(MAC_ADDRESS) ) | A type to represent a list of PoAs for a particular link. The LIST(MAC_ADDRESS) is sorted from most preferred first to least preferred last. | N/A |

FIG. 6

IE Definition Example

| No | Name of Information Element | Description | Data Type Name |
|---|---|---|---|
| | General Information Elements | | |
| 1.1 | TYPE_IE_NETWORK_TYPE | [Same as D05] | NETWORK_TYPE |
| 1.2 | TYPE_IE_OPERATOR_IDENTIFIER | [Same as D05] | OPERATOR_ID |
| 1.3 | TYPE_IE_SERVICE_PROVIDER_IDENTIFIER | [Same as D05] | SERVICE_PROVIDER_ID |
| | Access Network Specific Information Elements | | |
| 2.1 | TYPE_IE_ACCESS_NETWORK_IDENTIFIER | [Same as D05] | ACCESS_NETWORK_ID |
| 2.2 | TYPE_IE_NETWORK_SYSTEM_ID | [Same as D05] | NETWORK_SYSTEM_ID |
| 2.3 | TYPE_IE_ROAMING_PARTNERS | [Same as D05] | ROAMING_PARTNERS |
| 2.4 | TYPE_IE_COST | [Same as D05] | COST |
| 2.5 | TYPE_IE_NETWORK_SECURITY | [Same as D05] | NETWORK_SECURITY |
| 2.6 | TYPE_IE_NETWORK_QOS | [Same as D05] | NETWORK_QOS |
| 2.7 | TYPE_IE_NETWORK_DATA_RATE | [Same as D05] | DATA_RATE |
| 2.8 | TYPE_IE_NETWORK_IP_CONFIG_METHODS | [Same as D05] | IP_CONFIG_METHODS |
| 2.9 | ... | | |

FIG. 7

TLV Definition Example

| TLV Type Name | TLV Type Value | TLV Value Data Type | Defined Annex |
|---|---|---|---|
| SOURCE MIHF ID | 0 | MIHF_ID | M.2.8 |
| DESINTATION MIHF ID | 1 | MIHF_ID | M.2.8 |
| SESSION ID | 2 | SESSION_ID | M.2.9 |
| STATUS | 3 | ENUMERATED | M.2.1 |
| MIH EVENT LIST | 4 | MIH_EVENT_LIST | M.2.11 |
| ... | ... | ... | ... |

Note: 21-07-0158-00-0000-TLVTypeValues.ppt demonstrates why not using per-message TLV value assignment. See: ieee802.org/21/doctree/2007_Meeting_Docs/2007-05_meeting_docs/21-07-0158-01-0000-TLVTypeValues.ppt)

| TYPE (1 OCTET) | LENGTH (VARIABLE OCTETS) | VALUE (VARIABLE OCTETS) |
|---|---|---|
| TYPE OF THIS PARAMETER | LENGTH OF THE *VALUE* FIELD OF THIS PARAMETER | VALUE OF THIS PARAMETER |

DATA TYPE ENCODING FOR MEDIA INDEPENDENT HANDOVER

The present application claims priority to U.S. provisional application No. 60/917,549, filed on May 11, 2007, to Y. Oba, et al., the entire disclosure of which is incorporated herein by reference.

BACKGROUND

Background Applications

The present application also incorporates herein by reference the entire disclosures of all of the following patent applications for background reference:
1) U.S. Provisional Application No. 60/891,349, filed Feb. 23, 2007, to K. Taniuchi, et al.;
2) U.S. Provisional Application No. 60/825,567, filed Sep. 13, 2006 to Y. A. Cheng, et al.;
3) U.S. application Ser. No. 11/567,134, filed Dec. 5, 2006, to Y. Oba, et al.;
4) U.S. application Ser. No. 11/563,000, filed Nov. 23, 2006, to Y. Oba, et al.;
5) U.S. application Ser. No. 11/558,922, filed Nov. 12, 2006, to Y. Oba, et al.;
6) U.S. application Ser. No. 11/460,616, filed Jul. 27, 2006, to Y. Oba, et al.;
7) U.S. application Ser. No. 11/279,856, filed Apr. 14, 2006, to A. Dutta, et al., entitled Framework Of Media-Independent Pre-Authentication Improvements:
8) Including Considerations For Failed Switching And Switchback;
9) U.S. application Ser. No. 11/308,175, filed Mar. 9, 2006, to Y. Oba, et al., Framework of Media Independent Pre-Authentication Support for PANA;
10) U.S. application Ser. No. 11/307,362, filed February 2006, to A. Dutta, et al., entitled A Framework of Media-Independent Pre-authentication.

Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems.

"The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.)." See 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application. In addition, the provisional application from which priority is claimed herein also incorporated Draft 05 (Referred to herein as D05) of said standard, the entire contents of which is again incorporated herein by reference—i.e., see, e.g., I.E.E.E. P802.21/D05.00, April, 2007, Draft Standard for Local and Metropolitan Area Networks: Media Independent Handover Services, Sponsored by the LAN MAN Standards Committee of the I.E.E.E. Computer Society.

General Architecture:

Introduction:

The IEEE 802.21 standard is intended to facilitate a variety of handover methods. Such methods are generally classified as 'hard' or 'soft', depending on whether the handover procedure is "break before make" or "make before break" with respect to the data transport facilities that support the exchange of data packets between the mobile node and the network.

In general, handover involves cooperative use of both mobile node and network infrastructure in order to satisfy network operator and end user needs. Handover control, handover policies and other algorithms involved in handover decision making are generally handled by communication system elements which do not fall within the scope of the IEEE 802.21 standard. However, it is beneficial to describe certain aspects of the overall handover procedure so that the role and purpose of MIH Event Service, MIH Command Service, MIH Information Service and MIHF in overall handover process is clear.

General Design Principles:

The IEEE 802.21 standard is based on the following general design principles.

a) MIH Function is logical entity that helps and facilitates handover decision-making. Upper layers make handover decisions and link selection based on inputs and context from MIHF. Facilitating the recognition that a handover should take place is one of the key goals of MIHF. Discovery of information on how to make effective handover decisions is also a key component.

b) MIHF provides abstracted services to higher layers. From that perspective MIHF offers a unified interface to the upper layers. The service primitives exposed by this unified interface are based on the technology specific protocol entities of the different access networks. The MIHF communicates with the lower layers of the mobility-management protocol stack through technology-specific interfaces.

The specification of the MIHF interfaces with the lower layers generally does not fall within the scope of this standard. Such interfaces may already be specified as service access points (SAPs) within the standards that pertain to the respective access technologies, such as IEEE 802.1, IEEE 802.3, IEEE 802.11, IEEE 802.16, 3GPP and 3GPP2. This standard may contain recommendations to amend the existing access technology specific standards when modifications of the lower-layer interfaces may enable or enhance MIHF functionality.

c) Handover signaling (as part of handover execution and subsequent updates) may not be part of the standard. Different access networks support horizontal handover mechanisms (mobile initiated, network initiated, etc.). Handover initiation trigger may be useful in heterogeneous handovers when not done as per the homogeneous scheme.

d) MIHF may do further processing on MAC/PHY triggers and other related local events. Definition of this processing is outside the scope of the standard. The standard shall provide support for remote events as well. Events are advisory in nature. The decision whether to cause a handover or not based on these events is outside the scope of the standard.

e) The standard shall specify mechanisms to support MN-initiated, MN-controlled, network-initiated and network-controlled handovers.

f) The standard may support transparent inter-working with legacy equipment. Thus IEEE 802.21 compatible equipment should be able to co-exist with legacy non IEEE 802.21 compliant equipment.

Media Independent Handover Reference Framework:

The following sections describe aspects with regards to communication between different MIHF entities in the client device (MN) and the network.

MIHF functions communicate with each other for various purposes. The client device (mobile node) exchanges MIH information with its MIH Point of Service. The MIHF in any Network Entity becomes an MIH PoS when it communicates directly with a MN based MIHF. An MIH Network Entity may not have a direct connection to the MN and therefore does not constitute an MIH PoS for that particular MN. The same MIH Network Entity may still act as MIH PoS for a different MN. MIHF communication may not take place on all L2 interfaces of an MIH capable MN. As an example, on an MIH capable MN with three L2 interfaces namely 802.11, 802.16, and 802.3, the 802.3 interface may be used only for system administration and maintenance operations, while the 802.11 and 802.16 interfaces may engage in the provision of MIHF services. The MN may use L2 transport for exchanging MIH information with an MIH PoS that resides in the same Network Entity as its Network PoA. The MN may use L3 transport for exchanging MIH information with an MIH PoS that may not reside in the same Network Entity as its Network PoA. The framework supports use of either L2 or L3 mechanisms toward communication among MIH network entities.

FIG. 8 shows an MIH communication model. The model shows MIHFs in different distinctive roles and the communication relationships amongst them. The communication relationship shown in FIG. 8 applies only to MIHFs. It is noteworthy that each of the communication relationships in the communication model does not imply a particular transport mechanism. Rather, a communication relationship only intends to show that MIHF related information passing is possible between the two distinctive MIHFs. Moreover, 1) MIHF on the MN, 2) MIH PoS on the Network Entity that includes the serving PoA of the MN, 3) MIH PoS on the Network Entity that includes a candidate PoA for the MN (a candidate PoA is a PoA that the MN is aware of but not currently attached to; it becomes the target PoA if a handover eventually occurs), 4) MIH PoS on a Network Entity that does not include a PoA for the MN, 5) MIH non-PoS on a Network Entity that does not include a PoA for the MN.

The communication model also identifies the following communication reference points between different instances of MIHFs.

1) Communication reference point R1: Reference Point R1 refers to MIHF procedures between the MIHF on the MN and the MIH PoS on the Network Entity of its serving PoA. R1 may encompass communication interfaces over both L2 and L3 and above. MIHF content passed over R1 may be related to MIIS, MIES, or MICS.

2) Communication reference point R2: Reference Point R2 refers to MIHF procedures between the MIHF on the MN and the MIH PoS on the Network Entity of a candidate PoA. R2 may encompass communication interfaces over both L2 and L3 and above. MIHF content passed over R2 may be related to MIIS, MIES, or MICS.

3) Communication reference point R3: Reference Point R3 refers to MIHF procedures between the MIHF on the MN and the MIH PoS on a non-PoA Network Entity. R3 may encompass communication interfaces over L3 and above and possibly L2 transport protocol like Ethernet bridging, MPLS, etc. MIHF content passed over R3 may be related to MIIS, MIES, or MICS.

4) Communication reference point R4: Reference Point R4 refers to MIHF procedures between an MIH PoS in a Network Entity and an MIH non-PoS instance in another Network Entity. R4 may encompass communication interfaces over L3 and above. MIHF content passed over R4 may be related to MIIS, MIES, or MICS.

5) Communication reference point R5: Reference Point R5 refers to MIHF procedures between two MIH PoS instances in distinct Network Entities. R5 may encompass communication interfaces over L3 and above. MIHF content passed over R5 may be related to MIIS, MIES, or MICS.

Illustration of the MIH Communication Model:

A network model including MIH services is shown in FIG. 9 for greater illustration of the MIH Communication Reference Points. Moving from right to left, the model includes an MIH-capable mobile node (MN, far right) that supports multiple wired and wireless access technology options. The model assumes that the provisioning service provider either operates multiple access technologies or allows its user to roam into other networks when SLA in support of inter-working has been established. The MN has an MIHF implemented, which enables it to send specific MIH queries. The MN may have the information service partially implemented internally.

The model illustrates access networks that are connected in some loose, serial way to a core network (Operator 1-3 Core). Also depicted is an access network that is more tightly interworked or coupled (Access Network-3) The Operator 1-3 Core each might represent a service provider, corporate intranet provider or just another part of the visited or home access, or even core network. In this model the provisioning provider is operating Access Network-3 coupled via R1 to a core (labeled Visited/Home Core Network). The terms Visited and Home are used to indicate the provisioning service provider or enterprise. Any of the illustrated networks could be both a visited or home network depending on the relation of the operator to the provisioner of the MN. Network providers offer MIH services in their access networks (Access Network-1 to 4) to facilitate handover into their networks. Each access technology either advertises its MIH capability or responds to MIH service discovery. Each service provider for the access network allows access to one or more MIH Points of Service (PoS, compare with Communication Model) These PoS may provide some or all of the MIH services as determined during MIH capabilities discovery. The location or node of an MIH PoS is not fixed by the standard. The PoS location may vary based on operator deployment scenario and the technology-specific MIH architecture.

An MIH PoS may reside next to or be co-located with the point of attachment (PoA) in the access network Access Network 1, 2, 4 are typical). Alternatively the PoS may reside deeper inside the access or core networks (Access Network 3 is typical). As shown in FIG. 3, the MIH entity in the MN communicates with MIH network entities either by R1, R2 or R3 over any access network. When the PoA in the serving access network has a co-located MIH function, then an R1 reference connection terminates at the PoA which is also the PoS (MN to Access Network 1, 2, 4 of the model could all be R1) In that case an R3 reference connection would be terminated at any non-PoA (also illustrated by MN to Access Networks 1, 2, 4). MIH events may originate at both sides of an active R1 link. The MN is typically the first node to react to these events.

The interaction of visited and home network could be either for control and management purposes or for data transport purposes. It is also possible that due to roaming or SLA agreements, the home network may allow the MN to access the public Internet directly through a visited network. As illustrated, two MIH network entities may communicate with each other via R4 or R5 reference connections. The MIH capable PoA may also communicate with other MIH network entities via R3 and R4 reference points. The MIH capable MN could have a MIH communication with other PoA in the candidate access networks via R2 reference point to obtain information services about the candidate network.

With regard to the MIH Information Service (MIIS) the providers offer access to their information server located in a MIH PoS node (upper far left). The operator provides the MIIS to mobile nodes so they can obtain pertinent information including but not limited to new roaming lists, costs, provider identification information, provider services, priorities and any other information that would enable to select and utilize services. As illustrated, it is possible for the mobile node to be pre-provisioned with MIIS data by its provider.

Also possible is for the mobile node to obtain MIH information services from any access network of its provider. MIIS could also be available from another overlapping or nearby network, using that network's MIIS point of service. A provisioner's network (depicted here as coupled with Access Network 3) may utilize R3 and R4 interfaces to access other MIH entities like the provisioner's or visited network's MIH information server.

With regard to the MIH Command Service (MICS), any of the Information Database may be also used as command service PoS. The MN MIHF typically communicates with this server using a layer three transport.

MIHF Services:

The MIHF provides asynchronous and synchronous services through well defined SAPs for link layers and MIH users. In the case of a system with multiple network interfaces of arbitrary type, the upper layers may use the Event service, Command service and Information service provided by MIH to manage, determine, and control the state of the underlying interfaces.

These services provided by MIH help the upper layers in maintaining service continuity, service adaptation to varying quality of service, battery life conservation, and network discovery and link selection. In a system containing heterogeneous network interfaces of 802 types and cellular 3GPP, 3GPP2 types, the Media Independent Handover Function may help the upper layers to implement effective procedures to couple services across heterogeneous network interfaces. Upper layers may utilize services provided by the MIHF across different entities to query resources required for a handover operation between heterogeneous networks.

MIH services in mobile devices facilitate seamless handover between heterogeneous networks. An MIH user such as a mobility management protocol (example Mobile IP) could be supported for handover and seamless session continuity. This shall not preclude other protocols in addition to Mobile IP and even other upper layers from making use of MIH services to optimize handovers.

Mobile nodes employing MIH services would receive indications from link layers for asynchronous operations like Event service. The interaction with Command service and Information service will be through synchronous query and response type of mechanisms. The MIHF would also provide the functionality for the exchange of information between the network and host entities of the same media type. Note, if mechanism for such information exchange already exists with a given type of media (such as with some cellular media types), the MIHF will make use of the existing mechanism whenever possible.

MIH Protocol:

The IEEE 802.21 standard supports the Media Independent Event service, Media Independent Command service and Media Independent Information service. The MIH Protocol defines the format of the messages (i.e. MIHF packet with header and payload) that are exchanged between remote MIHF entities and the transport mechanisms that support the delivery of the messages. The selection of the transport mechanism is dependent on the access technology that connects the MN to the network and the location of the MIH PoS.

The packet payload for these services may be carried over L2 management frames, L2 data frames or other higher layer protocols. Wireless networks such as 802.11 and 802.16 have a management plane and support management frames which could be suitably enhanced for carrying the above payloads. However, the wired Ethernet network does not have management plane and may carry the above payloads only in data frames.

The IEEE 802.21 standard defines the packet format and payloads in media independent manner in standard TLV format. Thereafter, these packets may be encapsulated in a L2 MIH Protocol using MIHF ethertype when the payload needs to be sent over normal data frames as in case of Ethernet. In other cases the TLV based messages and payload may be directly encapsulated in media specific management frames. Alternatively, MIH protocol messages may be encapsulated using a lower layer (L2) or a higher layer (L3 and above) transport.

The IEEE 802.21 standard defines the format of MIH Protocol data unit (PDU) header and payload. Standard TLV format provides media-independent representation for the PDU payload contents. The MIHF PDUs are encapsulated in data frames with MIHF ethertype over 802 links. For 802.11 and 802.16 links extensions of media-specific management frames are recommended for carrying MIH messages. No assumptions are made in this standard regarding the transport of MIH messages over 3GPP and 3GPP2 access links at L2.

Media Independent Information Service:

Introduction:

Media Independent Information Service (MIIS) provides a framework by which an MIHF both in the mobile node and in the network may discover and obtain network information within a geographical area to facilitate handovers. The objective is to acquire a global view of all the heterogeneous networks relevant to the MN in the area to facilitate seamless handovers when roaming across these networks.

Media Independent Information Service includes support for various Information Elements (IEs). Information Elements provide information that is essential for a network selector to make intelligent handover decision.

Depending on the type of mobility, support for different types of information elements may be necessary for performing handovers. For example in case of horizontal handovers across different PoAs of the same access network, information available from lower link layers of access network may be sufficient. In such cases information elements like intra-technology neighbor reports and other link layer information required during handovers is directly available from the access network. In such cases the availability of higher layer services offered by the network may not change appreciably across different network point of attachment.

On the other hand, during vertical handovers there is a need to select appropriate PoA in the new network based on both optimum link layer connectivity as well as availability of appropriate higher layer services to permit service and session continuity for active user applications.

Media Independent Information Service (MIIS) provides the capability for obtaining the necessary information for handovers. This includes information about lower layers such as neighbor maps and other link layer parameters as well as information about available higher layer services such as internet connectivity, availability of VPN services, etc. The set of different higher layer services provided by the MIIS may constantly evolve. At the same time the list of access networks that are supported by MIIS may also evolve. As such, there is a need for flexibility and extensibility in the way the MIIS provides support for different information elements. Towards this end the MIIS defines a schema. The schema helps a client of MIIS to discover the capabilities of MIIS and also discover the entire set of different access networks and IEs supported by a particular implementation. Schema representation also allows the mobile node to query the information in a more flexible and efficient manner. As part of defining this schema the MIIS may also identify a set of basic information elements that may define the core functionality of different implementations of MIIS. Other information elements as they are added may become part of the extended set of MIIS capabilities.

MIIS provides information about different access networks such as 802 networks, 3GPP networks and 3GPP2 networks. The MIIS also allows this collective information to be accessed from any single network.

Thus for example using an 802.11 access network, it may be possible to get information not only about all other 802 networks in a particular region but also that of 3GPP and 3GPP2 networks as well. Similarly using a 3GPP2 interface, it may be possible to get access to information about all 802 and 3GPP networks in a given region. This capability allows the mobile node to use its currently active access network and scan for other available access networks in a geographical region. Thus, a mobile node is freed from the burden of powering up each of its individual radios and establishing network connectivity for the purpose of accessing heterogeneous network information. MIIS enables this functionality across all available access networks by providing uniform way to retrieve heterogeneous network information in any geographical area.

Information Service Elements:

The main goal behind the Information service is to allow mobile node and network entities to discover information that may influence the selection of appropriate networks during handovers. This information is intended to be primarily used by a policy engine entity that may make effective handover decisions based on this information. This information service is expected to provide mostly static type of information, although network configuration changes must also be accounted for. Other dynamic information about different access networks such as current available resource levels, state parameters, dynamic statistics etc. should be obtained directly from the respective access networks. Some of the key motivations behind the Information Service are as follows:

1) Provide information about the availability of access networks in a geographical area. Further, this information could be retrieved using any wireless network, for example, information about a nearby WiFi hotspot could be obtained using a GSM, CDMA, or any other cellular network, whether by means of request/response signaling, or information that is specifically or implicitly broadcast over those cellular networks. Alternatively, this information could be maintained in an internal database by the MN.

2) Provide static link layer information parameters that could help the mobile devices in selecting the appropriate access network. For example knowledge of whether security and QoS are supported on a particular access network may influence the decision to select such an access network during handovers.

3) The link layer information comprising of neighbor reports and information about capabilities of different PoAs could also aid in configuring the radios optimally (to the extent possible) for connecting to available/selected access networks. For example knowing about supported channels by different PoAs may help in configuring the channels optimally as opposed to scanning, beaconing etc. and then finding out this information. However, for most part, dynamic link layer parameters have to be obtained or selected based on direct interaction with the access networks and the Information Service may not be able to help much in that regard.

4) Provide an indication of higher layer services supported by different access networks and other relevant information that may aid in making handover decisions. Such information may not be available (or could not be made available) directly from MAC/PHY layers of specific access networks, but could be provided as part of the Information service. For example, in certain cases classification of different networks into categories such as public, enterprise, home, others, etc. may influence handover decision. Other information here may be more vendor/network specific in nature and could be specified in that form.

The information service elements are classified into three groups:

1) General Access Network Information: These information elements give a general overview of the different networks providing coverage within an area such as list of available networks and their associated operators, roaming agreements between different operators, cost of connecting to the network and network security and quality of service capabilities.

2) Information about Points of Attachment: These information elements provide information about different PoAs for each of the available access networks. These IEs include PoA addressing information, PoA location, data rates supported, the type of PHY and MAC layers and any channel parameters to optimize link layer connectivity. This may also include higher layer services and individual capabilities of different PoAs.

3) Other Information may be vendor/network specific, and could be specified appropriately.

Media Independent Handover Protocol:

Introduction:

The MIHF provides asynchronous and synchronous services through well defined SAPs for lower layers and upper layers. The services provided include the Event Service (ES), Command Service (CS), and Information Service (IS). Detailed description about MIH services are found in the 802.21 draft document. MIH SAPs include the MIH upper layer SAP, which is used by the users of MIH to gain access to various MIHF services, and MIH lower layer SAPs, which are used by MIHF to gain access and control of a variety of media dependent lower layer resources.

The MIH protocol defines frame formats for exchanging messages between peer MIHF entities. These messages are based on the primitives which are part of Media Independent Event service, Media Independent Command service and Media Independent Information service. IEEE 802.21 supports Media Independent Handover Function in mobile node, and network. The MIH Protocol allows peer MIHF entities to interact with each other.

In order for mobile node's MIHF entity to commence MIH protocol procedures, MIHF entity of mobile node may discover its peer remote MIHF entities. Peer remote MIHF entity is the correspondent MIHF entity with which MIHF of mobile node exchanges MIH protocol messages. Because peer remote MIHF entities reside in anywhere of the network, MIHF entity of mobile node may discover MIHF entity in the network before initiating MIH protocol procedure. This is done through the MIH Function Discovery procedure.

MIH Function Discovery can be done either at Layer 2 or Layer 3. However, this document only specifies how MIH Function Discovery is performed at Layer 2, when both MIH Functions are located within the same broadcast domain. MIH Function Discovery may be performed either through the MIH protocol (i.e. using L2 encapsulation such as LLC) or through media specific Layer 2 broadcast messages (i.e. 802.11 beacons, 802.16 DCD). MIH Function Discovery at Layer 3 is outside of scope of 802.21.

Once the peer MIHF has been discovered, the MN may discover the capabilities of the peer MIHF. This is done through the MIH Capability Discovery procedure. MIH Capability Discovery may be performed either through the MIH protocol or through media specific Layer 2 broadcast messages (i.e. 802.11 beacons, 802.16 DCD).

When the peer MIHF resides within the same broadcast domain as the MN, MIH Function Discovery can be performed using only MIH Capability Discovery.

Protocol Description:

The Media Independent Handover Protocol provides the following services:

1) MIHF Discovery (Layer 2 only): The MIHF in mobile node or in the network discovers which entity in the access networks supports MIHF.

2) MIH Capability Discovery: The MIHF entity discovers a list of supported events and commands, as well as supported query types for the Information Service.

3) MIH Remote Registration: Remote MIHF in different entities may register with each other to establish a new MIH session.

4) MIH Event Subscription: Interested entities may want to subscribe to a particular set of events from a given MIH-enabled entity.

5) MIH message exchange: Remote MIHF may exchange MIH messages using MIH payload and MIH protocol over a suitable transport. As part of message exchange the peer MIH Function entities may use the MIES, MICS and MIIS for effective handovers.

The standard describes the MIH frame format, message formats, and the procedures for MIH message exchange to facilitate handover in a media independent manner. However, handover policy and handover decision-making is outside the scope of the standard.

MIH Protocol Frame Format:

In MIH protocol messages, all TLV definitions are always aligned on an octet boundary and hence no padding is required. FIG. 11 shows the components of the MIH protocol frame.

Message Parameter TLV Encoding:

The TLV encoding shown in FIG. 12 is used for all parameters in an MIH protocol message. In this regard, the Type field shall be one octet2, and the Length shall be encoded with the rules described below (reproduced from sub-clause 6.5.6.2). Moreover, TLV Type values shall be unique within the MIH protocol. The TLV encoding starts at 1 and any subsequent values are assigned in ascending order.

With respect to sub-clause 6.5.6.2, MIIS defines two methods for representing Information Elements: binary representation and RDF representation (see W3C Recommendation, "Resource Description Framework (RDF)—Concepts and Abstract Syntax" and W3C Recommendation, "RDF/XML Syntax Specification"). MIIS also defines two query methods. For requests using the binary representation, the TLV query method defined. In the binary representation method, Information Elements are represented and encoded in Type-Length-Value form as shown in FIG. 10. In that regard, the Length field is interpreted as follows.

Case 1: If the number of octets occupied by the Value field is less than 128, the size of the Length field is always 1 octet and the MSB of the octet is set to the value '0'. The values of the other seven bits of this octet indicate the actual length of the Value field.

Case 2: If the number of octets occupied by the Value field is exactly 128, the size of the Length field is one octet. The MSB of the Length octet is set to the value '1' and the other seven bits of this octet are all set to the value '0'.

Case 3: If the number of octets occupied by the Value field is greater than 128, then the Length field is always greater than 1 octet. The MSB of the first octet of the Length field is set to the value '1' and the remaining 7 bits of the first octet indicate the number of octets that are appended further. The number represented by the 2nd and subsequent octets of the Length field, when added to 128, indicates the total size of the Value field, in octets.

Illustrative Architecture:

FIG. 13 depicts some illustrative architectural components that can be employed in some illustrative and non-limiting implementations including wireless access points to which client devices communicate. In this regard, FIG. 13 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 14 shows an illustrative computer or control unit that can be used to implement computerized process steps, to be carried out by devices, such as, e.g., an access point, a user station, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The preferred embodiments of the present invention improve upon the foregoing and other background technologies.

According to an aspect of the preferred embodiments of the present invention, data types and their encoding rules are defined in a common place. According to an aspect of the preferred embodiments, IEs, TLVs and primitives are defined using such data types.

Aspects of preferred embodiments provide a variety of advantages, such as, e.g., a) duplicate format definition can be avoided, b) the 802.21 specification can be more readable (e.g., detailed type definitions are not in the main sections). In addition, aspects of the preferred embodiments of the invention can, e.g., a) eliminate duplicate data type definition for IEs, primitives and TLVs to eliminate inconsistency, b) clearly separate abstract data type and encoding rule (e.g., use of TLV-in-TLV is difficult to achieve the clear separation for primitive parameters), c) solve ordering issues on repetitive TLVs in several messages (e.g., PreferredCandidateLink 1 . . . k).

According to some embodiments, a normative Annex with added encoding rules is provided that defines data types used in the IEEE 802.21 standard. Preferably, any variable-length data type in this specification contains information needed for determining the end of data. Preferably, TLVs for the component IEs contained in an Access Network Container and a PoA Container are defined in the Annex.

In the preferred embodiments, novel encoding rules are applied to data types and set forth in the above-noted Annex.

Data Type categories include general or basic data types and derived data types. Data Type categories are discussed further below.

According to some embodiments, a method of employing an encoding scheme for media independent handover is provided that comprises: having at least some data type carry only required information to determine the end of data without a length value. In some embodiments, type is defined to determine length. In some embodiments, the data types are carried in message exchanges between nodes performing an 802.21 media independent handover. In some embodiments, the method further includes employing a binary encoding rule when the data types are carried in MIH protocol messages.

In some examples, the method further includes employing the following binary encoding rule related to a SEQUENCE data type: DATATYPE1,DATATYPE2,[, . . . ] are encoded in the order of appearance, where each data type is encoded using the encoding rule for the data type.

In some examples, the method further includes employing the following binary encoding rule related to a CHOICE data type: a one-octet selector field, followed by a variable length Value field, wherein the Selector value determines the data type, and wherein if Selector==i, (i+1)-th data type in the list of data types DATATYPE1,DATATYPE2,[, . . . ] is selected, and the Value field is encoded using the encoding the rule for the selected data type.

In some examples, the method further includes employing the following binary encoding rule related to a BITMAP data type: each bit of a BITMAP(N) value [N=8*i, i=1, 2, . . . ] is encoded as an N/8-octet value in order of significance.

In some examples, the method further includes employing the following binary encoding rule related to an INTEGER data type: each octet of an INTEGER(N) value [N=1, 2, . . . ] is encoded in network-byte order into an N-octet field.

In some examples, the method further includes employing the following binary encoding rule related to a CHAR data type: each character is encoded in order of appearance where each bit of each character is encoded in order of significance.

In some examples, the method further includes employing the following binary encoding rule related to an UNSIGNED INTEGER data type: each octet of an UNSIGNED_INT(N) value [N=1, 2, . . . ] is encoded in network-byte order into an N-octet field.

In some examples, the method further includes employing the following binary encoding rule related to a LIST (DATATYPE) data type: a variable length Length field is followed by a variable length Value field, where the Length field value is in terms of number of list elements in the list.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is an illustrative chart depicting basic data types according to some preferred embodiments of the invention;

FIG. 2 is an illustrative diagram showing an attribute of type LIST (LINK-ID) with two elements encoded according to some illustrative embodiments;

FIG. 3 is an illustrative chart depicting general purpose derived data types according to some embodiments;

FIG. 4 is an illustrative chart depicting addresses derived data types according to some embodiments;

FIG. 5 is an illustrative chart depicting link identification derived data types according to some embodiments;

FIG. 6 is an illustrative chart depicting exemplary IE definition according to some embodiments;

FIG. 7 is an illustrative chart depicting exemplary TLV definition according to some embodiments;

DISCUSSION OF THE PREFERRED EMBODIMENTS

Figure 8:
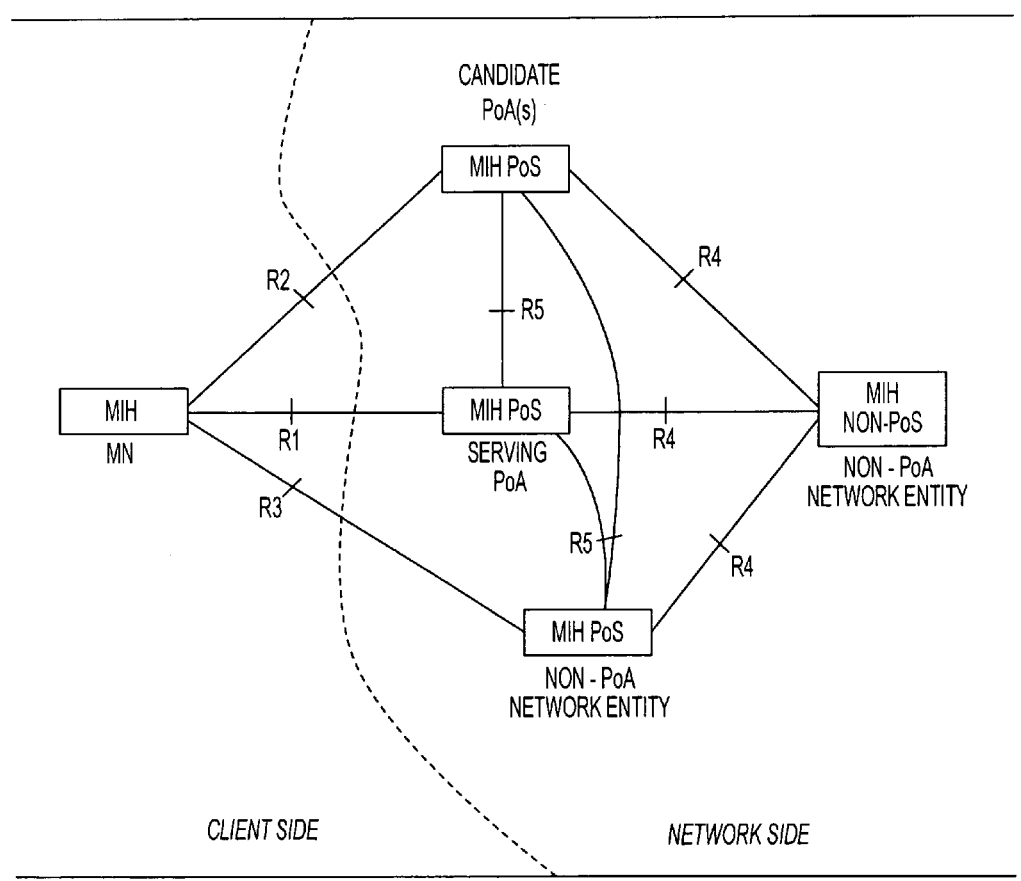
FIG. 8 shows an illustrative MIH communication model according to the illustrative background art shown in 802.21 for background and educational purposes.
Figure 9:
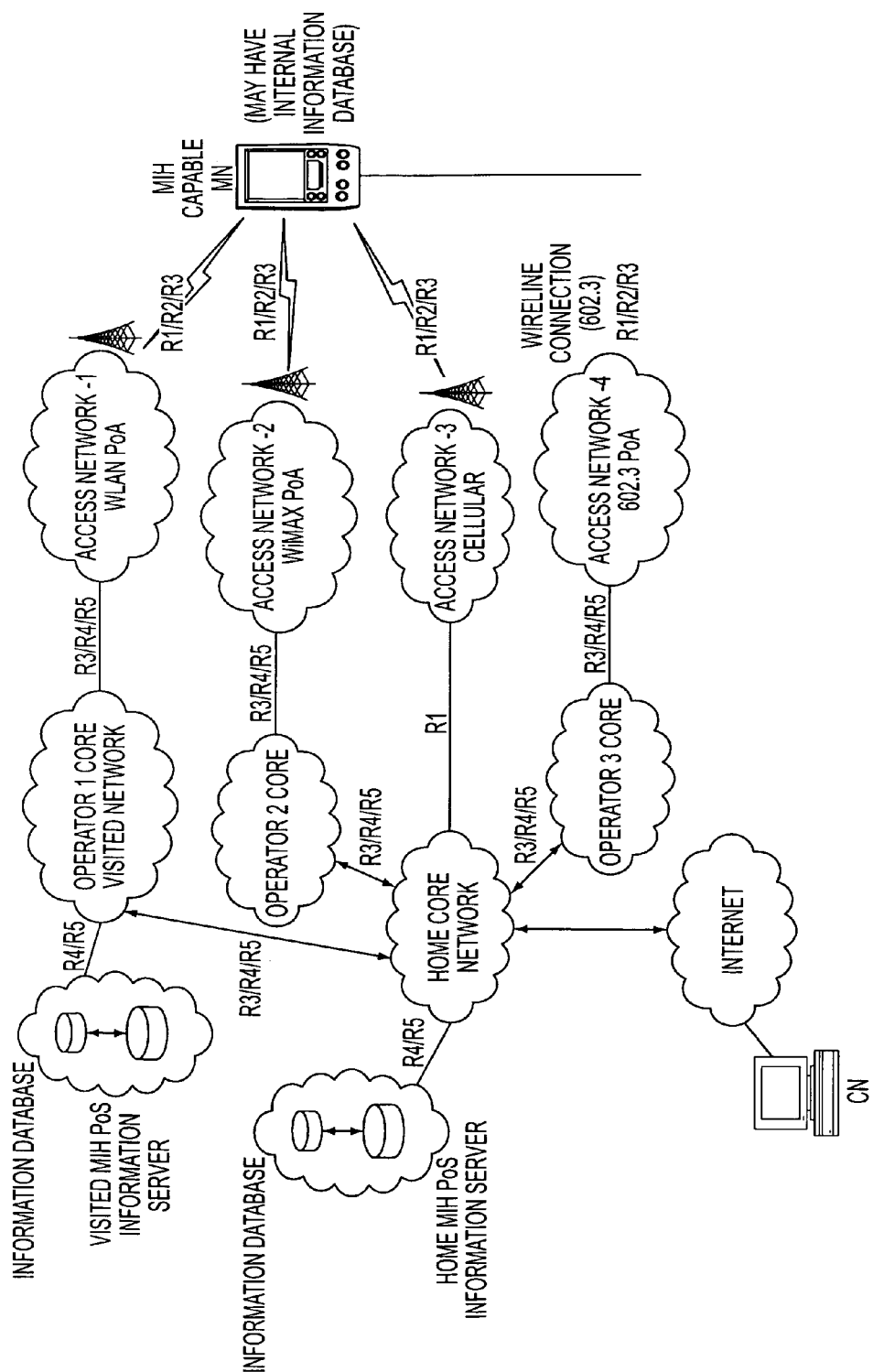
FIG. 9 is an illustrative network model including MIH services for illustration of MIH Communication Reference Points according to the illustrative background art shown in 802.21 for background and educational purposes.
Figure 10:
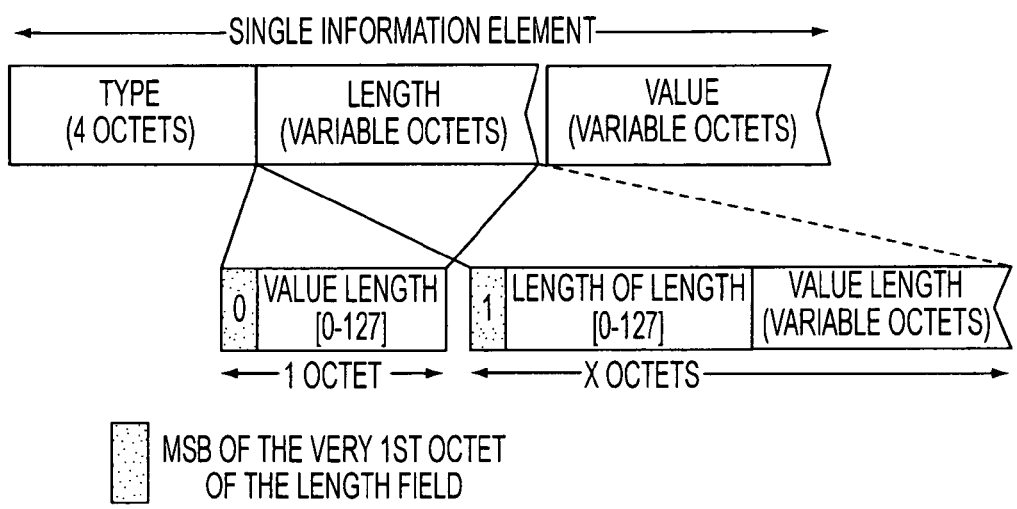
FIG. 10 shows, in a binary representation method, Information Elements represented and encoded in Type-Length-Value form.
Figures 11, 12:
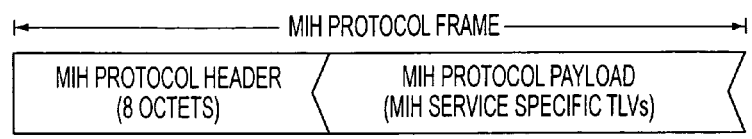
FIG. 11 shows components of an MIH protocol frame.
FIG. 12 shows TLV encoding used for all parameters in an MIH protocol message.
Figure 13:
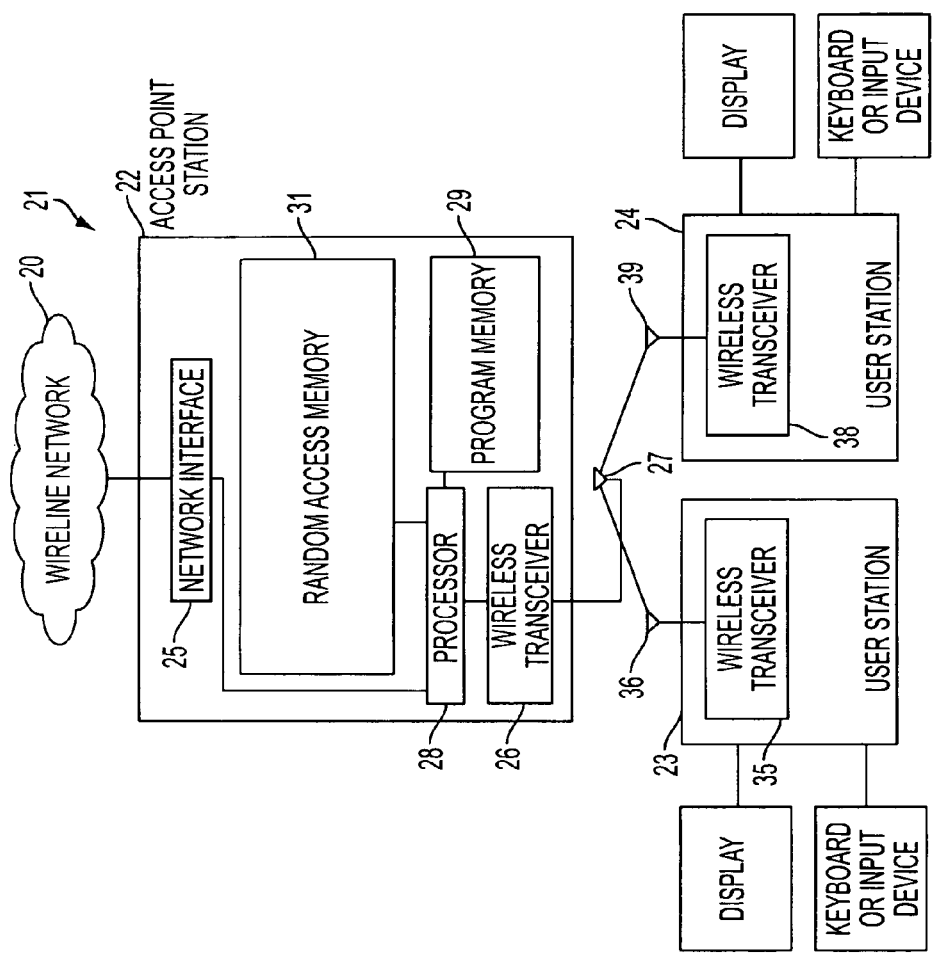
FIG. 13 is an illustrative architectural diagram demonstrating illustrative components of system architecture according to some examples.
Figure 14:
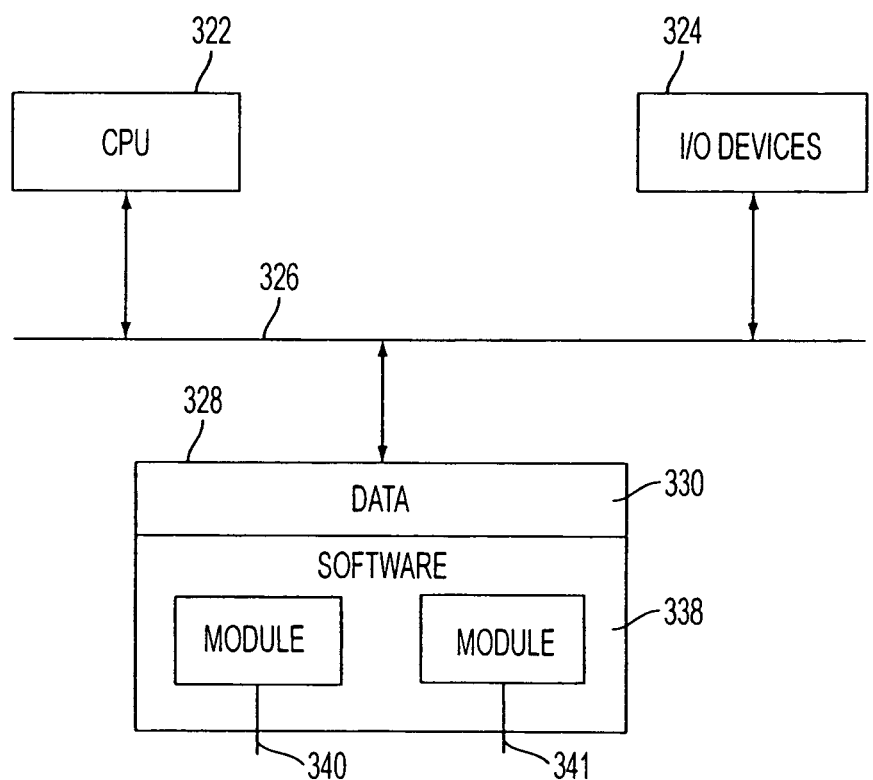
FIG. 14 shows features according to an illustrative computer or control unit that can be used to implement computerized process steps, to be carried out by devices, such as, e.g., an access point, a user station, a source node or destination node in some embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

The present application sets forth, e.g., some solutions to problems and advances over existing data type encoding in 802.21.

The terminology for the Information Services encodings can be considered expansively since there are a variety of data types being created—although they are all encoded as TLV. In addition, other parts of the MIH protocol are encoded in TLV, but are not related to the IS. For the information elements, these could be referred to using the terminology "binary encoding" instead of "TLV," such that a TLV query method can be referred to as Binary query method. The following concepts and data types should be understood: MIH protocol messages carry TLVs; Information Service Information Elements can be binary encoded; a "container" can hold a group of IEs; and a "list" can hold an ordered group of "containers."

Introduction:

In the background draft of the 802.21 standard document, value encoding rules for some TLVs were defined in IE definition (while others are defined in TLV definition), such as, e.g., a) Link Identifier TLV value is defined in Table 9 of Section 6.4.6.1.1; b) Location TLV value is defined in 6.4.6.3.2; c) Link parameter value list refers to "generic link parameters" and d) the parameters were defined in Section 6.4.6.2.6. In addition, there were a lot of duplicate value assignment in primitive definition and TLV definition, such as, e.g., a) SuppportedMIHCommandList bitmap is defined in Sections 7.4.1.2.2, 7.4.1.3.1, 7.4.1.4.2 and 8.5.2, b) LinkAction is defined in Sections 7.3.15.12 and 8.5.27, c) etc.

The Proposed Approach:

According to an aspect of the preferred embodiments of the present invention, data types and their encoding rules are defined in a common place. In that regard, this involved, e.g., moving former 802.21 draft standard Table 22 to a normative Annex with adding encoding rule.

According to an aspect of the preferred embodiments, IEs, TLVs and primitives are defined using such data types.

Aspects of preferred embodiments provide a variety of advantages, such as, e.g., a) duplicate format definition can be avoided, b) the 802.21 specification can be more readable (e.g., detailed type definitions are not in the main sections). In addition, aspects of the preferred embodiments of the invention can, e.g., a) eliminate duplicate data type definition for IEs, primitives and TLVs to eliminate inconsistency, b) clearly separate abstract data type and encoding rule (e.g., use of TLV-in-TLV is difficult to achieve the clear separation for primitive parameters), c) solve ordering issues on repetitive TLVs in several messages (e.g., PreferredCandidateLink 1 . . . k).

According to some embodiments, a normative Annex with added encoding rules is provided that defines data types used in the IEEE 802.21 standard. Preferably, any variable-length data type in this specification contains information needed for determining the end of data. Preferably, TLVs for the component IEs contained in an Access Network Container and a PoA Container are defined in the Annex.

Data Type Categorization:

In the preferred embodiments, novel encoding rules are applied to data types and set forth in the above-noted Annex. Data Type categories include general or basic data types and derived data types. Data Type categories are discussed further below.

Basic/General Data Types:

Basic data types involve data types that are not derived from any other data types, including, e.g., those that are for general purpose.

For reference, FIG. 1 shows an illustrative Annex portion setting forth basic data types. Preferably, the basic data types defined in this section are used as the basis for defining any other data types. Preferably, all basic data types are for general purpose. The "Binary Encoding Rule" depicted in the right column sets forth the encoding rules used when the data types are carried in MIH protocol messages. With respect to encoding rule of LIST(DATATYPE) Data Type at M.1.1 shown in FIG. 1, the following encoding is preferably used for LIST(DATATYPE) data type.

A variable length Length field, followed by a variable length Value field. The Length field value is in terms of number of list elements in the list. The format of the Length field is defined as follows. Specifically, if the actual number of list elements in the Value field is less than or equal to 127, then:
  The Length field shall occupy one octet
  The MSB of the Length field shall be set to 0, and
  The other 7 bits of the Length field shall be used to indicate the actual length of the Value field in the number of list elements.
If the number of list elements of the Value field is exactly 128, then:
  The Length field shall occupy one octet
  The MSB of the Length field shall be set to the value '1', and
  The other seven bits of the Length field shall all be set to the value '0'.
If the number of list elements of the Value field is more than 127, then:
  The Length field shall occupy more than one octet
  The MSB of the first octet of the Length field shall be set to 1.
  The other 7 bits of the first octet of the Length field shall be used to indicate the number of additional octets of the Length field (i.e., excluding the first octet), and
  The value of the remaining octets (i.e., excluding the first octet) of the Length field, when added to 128, shall be used to indicate the actual length of the Value field in number of list elements.
  Each of list elements are encoded in the Value field in order of appearance.
  If there is no list element, the Value field is not encoded.
  For example, an attribute of type LIST(LINK-ID) with two list elements can be encoded in the manner as depicted in FIG. 2 (LINK_ID is defined in M.2.3).

As shown in FIG. 1, the system can employ the following binary encoding rule related to a SEQUENCE data type: DATATYPE1,DATATYPE2,[, . . . ] are encoded in the order of appearance, where each data type is encoded using the encoding rule for the data type.

As shown in FIG. 1, the system can also employ the following binary encoding rule related to a CHOICE data type: a one-octet selector field, followed by a variable length Value field, wherein the Selector value determines the data type, and wherein if Selector=i, (i+1)-th data type in the list of data types DATATYPE1,DATATYPE2,[, . . . ] is selected, and the Value field is encoded using the encoding the rule for the selected data type.

As shown in FIG. 1, the system can also employ the following binary encoding rule related to a BITMAP data type: each bit of a BITMAP(N) value [N=8*i, i=1, 2, . . . ] is encoded as an N/8-octet value in order of significance. In some embodiments, a BITMAP encoding rule can be defined as: a BITMAP(N), where N must be a multiple of an N/8 octet values and encoded in network byte order. Note: this data type can often be used to represent a list of IDs.

As shown in FIG. 1, the system can also employ the following binary encoding rule related to a INTEGER data type: each octet of an INTEGER(N) value [N=1, 2, . . . ] is encoded in network-byte order into an N-octet field. In some embodiments, the most significant bit of the first octets is the sign bit. Preferably, if the sign bit is set, it indicates a negative integer. Otherwise, it preferably indicates a non-negative integer. A negative integer is preferably encoded as 2's complement.

As shown in FIG. 1, the system can also employ the following binary encoding rule related to a CHAR data type: each character is encoded in order of appearance where each bit of each character is encoded in order of significance. In some embodiments, a CHAR data type is encoded such that the characters are encoded in network byte order.

As shown in FIG. 1, the system can also employ the following binary encoding rule related to a UNSIGNED INTEGER data type: each octet of an UNSIGNED_INT(N) value [N=1, 2, . . . ] is encoded in network-byte order into an N-octet field.

Derived Data Types:

Derived Data Types involve Data types that are derived from other data types (e.g., from General Data Types). For example, Derived Data Types include those that are derived from other data types or parent data types. A derived data type uses the same encoding as the parent data type, including, e.g.:

Data Types for general purpose (see, e.g., exemplary derived types, general purpose, shown in FIG. 3);

Data Types for addresses (see, e.g., exemplary derived types, addresses, shown in FIG. 4);

Data Types for link Identification and manipulation (see, e.g., exemplary derived types, link identification, shown in FIG. 5);

Data Types for QoS;

Data Types for location;

Data Types for IP configuration;

Data Types used by Information Elements.

For reference, the following sections set forth additional details related to some illustrative examples of, e.g., derived data types according to some preferred embodiments.

Data Types for General Purpose:

The derived data types defined in this section are for general purpose.

| Type Name | Derived From | Definition | Valid Range |
|---|---|---|---|
| ENUMERATED | INTEGER(1) | A type to represent an enumerated attribute. | 0-255 |
| BOOLEAN | ENUMERATED | A type to represent a Boolean attribute. | 0: False, 1: True |
| OCTET_STRING | LIST(CHAR(1)) | A type to represent an array of octets. | N/A |
| PERCENTAGE | INTEGER(1) | A type to represent a percentage. | 0-100 |
| STATUS | ENUMERATED | A type to represent a status of a primitive execution. | 0 Success<br>1 Unspecified Failure<br>2 Rejected<br>3 Authorization Failure<br>4 Network Error |

Data Types for Addresses:

The data types defined in this section are related to addresses of network elements.

| Type Name | Derived From | Definition | Valid Range |
|---|---|---|---|
| TRANSPORT_ADDRESS | OCTET_STRING | A type to represent a transport address using Address base type defined in RFC3588. The First 2-octet contains AddressType. | AddressType values are defined in http://www.iana.org/assignments/address-family-numbers. |
| MAC_ADDRESS | TRANSPORT_ADDRESS | A type to represent a MAC address. | The AddressType contains the one used for a specific link layer. |
| IP_ADDRESS | TRANSPORT_ADDRESS | A type to represent an IP address. | The AddressType contains either 1 (IPv4) or 2 (IPv6). |

Data Types for Link Identification and Manipulation:

The data types defined in this section are used for representing attributes for identification and manipulation of links.

| Type Name | Derived From | Definition | Valid Range |
|---|---|---|---|
| LINK TYPE | INTEGER(4) | A type to represent a link type. | 0: Reserved<br>1: Wireless - GSM<br>2: Wireless - GPRS<br>3: Wireless - EDGE<br>15: Ethernet<br>18: Wireless - Other<br>19: Wireless - IEEE 802.11<br>22: Wireless - CDMA2000<br>23: Wireless - UMTS<br>24: Wireless - cdma2000-HRPD<br>27: Wireless - IEEE 802.16<br>28: Wireless - IEEE 802.20<br>29: Wireless - IEEE 802.22 |
| LINK_ID | SEQUENCE(<br>LINK_TYPE<br>MAC_ADDRESS) | A type to represent the identifier of a link that is not associated with any PoA. The MAC_ADDRESS contains a MAC address of MN. This may be used for the current link being used by MN or the link that was used by MN before handover. | N/A |

-continued

| Type Name | Derived From | Definition | Valid Range |
|---|---|---|---|
| LINK_TUPLE_ID | SEQUENCE(LINK_ID, CHOICE(MAC_ADDRESS, NULL)) | A type to represent the identifier of a link that may be associated with a PoA. The optional MAC_ADDRESS contains a MAC address of PoA. | N/A |
| LINK_POA_LIST | SEQUENCE(LINK_ID, LIST(MAC_ADDRESS)) | A type to represent a list of PoAs for a particular link. The LIST(MAC_ADDRESS) is sorted from most preferred first to least preferred last. | N/A |
| LINK_ACTIONS | BITMAP(32) | A type to represent a set of actions for a link. The meaning of each link action is defined in Table M3. | Bit 0: LINK_DISCONNECT<br>Bit 1: LINK_LOW_POWER<br>Bit 2: LINK_POWER_DOWN<br>Bit 3: LINK_NO_ACTION<br>Bit 4: LINK_RESOURCE_RETAIN<br>Bit 5: DATA_FORWARDING_REQUEST<br>Bit 6: LINK_POWER_UP<br>Bit 7-31: (Reserved) |

TABLE M1

Link Actions

| Action Name | Description |
|---|---|
| LINK_DISCONNECT | Disconnect the link connection directly. |
| LINK_LOW_POWER | Cause the link to adjust its RF power level to be low power consumption. |
| LINK_POWER_DOWN | Cause the link to power down so as to stop transmitting and enter idle mode or turn off the radio. |
| LINK_NO_ACTION | The link need not take any action. |
| LINK_RESOURCE_RETAIN | The link will be disconnected but the resource for the link connection still remains so reestablishing the link connection later can be more efficient. |
| DATA_FORWARDING_REQUEST | This indication requires the buffered data at the old serving PoS entity to be forwarded to the new target PoS entity in order to avoid data loss. This action can be taken immediately after the old serving PoS receives the MIH_Handover_Commit.response message from the new target PoS. |
| LINK_POWER_UP | TBD. |

| Type Name | Derived From | Definition | Valid Range |
|---|---|---|---|
| LINK_ACTION_REQ | SEQUENCE(LINK_ID, LINK_ACTIONS, LINK_AC_EXEC_TIME) | A type to represent a set of handover action request parameters. | N/A |
| LINK_ACTION_RESP | SEQUENCE(LINK_ID, LINK_AC_RESULT_CODE) | A type to represent a set of handover result parameters. | N/A |
| LINK_AC_EXEC_TIME | INTEGER(2) | A type to represent a time (in msec) elapsed before an action needs to be taken, if Execution Time = 0 then the action is expected to be taken immediately. | 0-1000. |
| LINK_AC_RESULT_CODE | ENUMERATED | A type to represent an handover action result. | 0 Resource Unavailable<br>1 Resource Busy<br>2 Resource Available<br>3 Abort Handover<br>4 Perform Handover |
| LINK_EVENT_LIST | BITMAP(32) | A type to represent a bitmap of link event types. | Bit 0: Link_Up<br>Bit 1: Link_Down<br>Bit 2: Link_Going_Down<br>Bit 3: Link_Event_Rollback<br>Bit 4: Link_Detected<br>Bit 5: Link_Parameters_Report<br>Bit 6: Link_PDU_Transmit_Status<br>Bit 7: Link_Handover_Imminent<br>Bit 8: Link_Handover_Complete<br>Bit 9-31: (Reserved) |
| LINK_COMMAND_LIST | BITMAP(32) | A type to represent a set of supported Link events. | Bit 0: Link_Capability_Discover<br>Bit 1: Link_Event_Subscribe<br>Bit 2: Link_Event_Unsubscribe<br>Bit 3: Link_Configure_Thresholds<br>Bit 4: Link_Get_Parameters<br>Bit 5-31: (Reserved) |

TABLE M1-continued

| | | Link Actions | |
|---|---|---|---|
| LINK_PARAM | CHOICE( QOS_PARAM, NON_QOS_PARAM) | A type to represent a link parameter. [Note: The NON_QOS_PARAM needs to be defined.] | N/A |
| LINK_CONFIG_STATUS | SEQUENCE( LINK_PARAM_TYPE, CONFIG_STATUS) | A type to represent a status of link parameter configuration. | N/A |
| LINK_PARAM_TYPE | CHOICE( QOS_TYPE, NON_QOS_TYPE) | A type to represent a configuration response. [Note: The NON_QOS_TYPE needs to be defined.] | N/A |
| CONFIG_STATUS | ENUMERATED | A type to represent a status of link parameter configuration. | 0 Success<br>1 Error |
| LINK_DOWN_REASON | ENUMERATED | A type to represent the reason of a link down event. | See Table M2. |

TABLE M2

Valid Range of LINK_DOWN_REASON_CODE
[Move Table 34 of D05 here].

| Type Name | Derived From | Definition | Valid Range |
|---|---|---|---|
| LINK_GOING_DOWN_REASON | ENUMERATED | A type to represent the reason of a link going down event. | See Table M3. |

TABLE M3

Valid Range of LINK_GOING_DOWN_REASON_CODE
[Move Table 35 of D05 here].

| Type Name | Derived From | Definition | Valid Range |
|---|---|---|---|
| LINK_MIH_CAPABILITY_FLAG | BOOLEAN | A type to represent whether the MIH capability is supported or not. | TRUE: MIH Capability Not Supported<br>FALSE: MIH Capability Supported |
| LINK_STATUS_REQ | BITMAP(32) | A type to represent a link status being requested. | Bit #0: DEVICE_INFO<br>Bit# 1: OPERATION_MODE<br>Bit# 2: CHANNEL_ID<br>Bit# 3: BATTERY_LEVEL<br>Bit# 4: LINK_QOS_TYPE_LIST<br>Bit# 5-255: reserved |
| LINK_STATUS_RESP | SEQUENCE( LINK_ID, LIST(LINK_STATUS)) | A type to represent a set of parameters of the status of the link specified by LINK_ID. | N/A |
| LINK_STATUS | CHOICE( DEVICE_INFO, OPERATION_MODE, CHANNEL_ID, BATTERY_LEVEL, QOS_TYPE) | A type to represent a parameter of the status of a link. | N/A |
| DEVICE_INFO | OCTET_STRING | A type to represent information on manufacturer, model number, revision number of the software/firmware and serial number in displayable text are returned. | N/A |
| OPERATION_MODE | INTEGER(1) | A type to represent the power mode of a link. | 0x00 Normal Mode<br>0x01 Power Saving Mode<br>0x02 Power Down |

TABLE M3-continued

Valid Range of LINK_GOING_DOWN_REASON_CODE
[Move Table 35 of D05 here].

| Type Name | Derived From | Definition | Valid Range |
|---|---|---|---|
| CHANNEL_ID | INTEGER(1) | The ID of the channel currently in use. | N/A |
| BATTERY_LEVEL | PERCENTAGE | Battery level in percentage. | 1-100 |
| LINK_CONFIG_REQ | CHOICE( OPERATION_MODE, LIST(LINK_PARAM)) | A type to represent a configuration request. | N/A |
| SIGNAL_STRENGTH | PERCENTAGE | A type to represent signal strength. | 1-100 |
| LINK_SCAN_RESP | SEQUENCE( MAC_ADDRESS, SIGNAL_STRENGTH) | A type to represent a scan response. The MAC_ADDRESS contains a MAC address of PoA. | N/A |
| LINK_RESOURCE_SET | SEQUENCE( LINK_ID, AVAILABLE_RESOURCE_LIST ) | A type to represent a available resources for a link. | N/A |
| LINK_RESOURCE_STATUS | BOOLEAN | A type to represent whether resources are available or not. | TRUE: Not Available FALSE: Available |
| LINK_RESOURCE_STATUS | BOOLEAN | A type to represent whether resources are available or not. | TRUE: Not Available FALSE: Available |
| LINK_RESOURCE_RETENTION_STATUS | BOOLEAN | A type to represent a status of resource. | TRUE: Retain resources FALSE: Release resources |

Data Types for QoS:
The data types defined in this section are related to QoS.

| Type Name | Derived From | Definition | Valid Range |
|---|---|---|---|
| QOS_TYPE | CHOICE( QOS_TYPE_GENERIC, ...) | A type to represent a QoS type. [Note: Currently QoS type for Generic Link is defined.] | See below. |
| QOS_TYPE_GENERIC | ENUMERATED | A type to represent a QoS type for Generic Link type. | 0: Number of supported CoS 1: Throughput (kbs) 2: Packet Error Rate 3: CoS Minimum Packet Transfer Delay (ms) 4: CoS Average Packet Transfer Delay (ms) 5: CoS Maximum Packet Transfer Delay (ms) 6: CoS Packet Transfer Delay Jitter (ms) 7: CoS Packet Loss Rate 8~255: Reserved [Editor's note: The QoS parameters for other link specific types are TBD.] |
| ... | ... | ... | ... |
| QOS_PARAM | CHOICE( QOS_PARAM_GENERIC, ...) | A type to represent QoS parameters for a link type. [Note: Currently QoS parameters for Generic Link is defined.] | N/A |
| QOS_PARAM_GENERIC | CHOICE( NUM_QOS_TYPES, THROUGHPUT, PACKET_ERROR_RATE, MIN_PACKET_DELAY, AVG_PACKET_DELAY, MAX_PACKET_DELAY, PACKET_DELAY_JITTER, PACKET_LOSS_RATE) | A type to represent a QoS parameter. | N/A |
| ... | ... | ... | ... |
| NUM_QOS_TYPES | INTEGER(1) | A type to represent the number of differentiable classes of service supported. | 0-255 |

-continued

| Type Name | Derived From | Definition | Valid Range |
|---|---|---|---|
| THROUGHPUT | INTEGER(4) | A type to represent the maximum information transfer rate achievable. It is measured in kbs. | 0-2^32-1 |
| PACKET_ERROR_RATE | INTEGER(2) | A type to represent a value equal to the integer part of the result of multiplying -100 times the log10 of the ratio between the number of packets received in error and the total number of packets transmitted in a link population of interest. | N/A |
| MIN_PACKET_DELAY | SEQUENCE( COS_ID, INTEGER(2)) | A type to represent the minimum packet transfer delay in msec for the specific CoS specified by the COS_ID. | N/A |
| AVG_PACKET_DELAY | SEQUENCE( COS_ID, INTEGER(2)) | A type to represent the average packet transfer delay in msec for the specific CoS specified by the COS_ID. | N/A |
| MAX_PACKET_DELAY | SEQUENCE( COS_ID, INTEGER(2)) | A type to represent the maximum packet transfer delay in msec for the specific CoS specified by the COS_ID. | N/A |
| PACKET_DELAY_JITTER | SEQUENCE( COS_ID, INTEGER(2)) | A type to represent the packet transfer delay jitter in msec for the specific CoS specified by the COS_ID. | N/A |
| PACKET_LOSS_RATE | SEQUENCE ( COS_ID, INTEGER(2)) | A type to represent the packet loss rate for the specific CoS specified by the COS_ID. The loss rate is equal to the integer part of the result of multiplying -100 times the log10 of the ratio between the number of packets lost and the total number of packets transmitted in the class population of interest. | N/A |
| COS_ID | INTEGER(2) | A type to represent a class of service identifier. | 0-255 |

Data Types for Location:
The data types defined in this section are related to location.

Data Types for IP Configuration:
The data types defined in this section are related to IP configuration.

TABLE M4

Valid Range of GEOSPATIAL_LOCATION
[Move Table 17 of D05 here].

| Type Name | Derived From | Definition | Valid Range |
|---|---|---|---|
| LOCATION | CHOICE( SEQUENCE( CIVIC_LO_METHOD, CIVIC_LOCATION)), SEQUENCE( GEO_LO_METHOD, GEO_LOCATION)) | A type to represent the way location information was derived or discovered. | See below. |
| CIVIC_LO_METHOD | ENUMERATED | A type to represent the way civic address location information was derived or discovered. | 0: Manual<br>1-255: Reserved |
| CIVIC_LOCATION | SEQUENCE( CIVIC_COUNTRY_CODE, CIVIC_ADDR_ELEM) | A type to represent a civic address. | See below. |
| CIVIC_COUNTRY_CODE | CHAR(2) | A type to represent a country code. | Two-letter ISO 3166 country code in capital ASCII letters. |
| CIVIC_ADDR_ELEM | OCTET_STRING | A type to represent civic address elements. | Civic address elements, as defined in IETF RFC 4676. |
| GEO_LO_METHOD | ENUMERATED | A type to represent the way geospatial location information was derived or discovered. | 0: GPS<br>1: Assisted GPS<br>2: Manual<br>3: Provided by dynamic host configuration protocol (DHCP)<br>4: Triangulation<br>5-255: Reserved |
| GEO_LOCATION | CHAR(16) | A type to represent a geospatial location. | See Table M4. |

| Type Name | Derived From | Definition | Valid Range |
|---|---|---|---|
| IP_CONFIG_METHODS | BITMAP(32) | A type to represents a set of IP configuration methods. | Bit 0: IPv4 static configuration<br>Bit 1: IPv4 dynamic configuration (DHCPv4)<br>Bit 2: Mobile IPv4 with foreign agent (FA) care of address (CoA) (FA-CoA)<br>Bit 3: Mobile IPv4 without FA (Co-located CoA)<br>Bits 4-10: reserved for IPv4 address configurations<br>Bit 11: IPv6 stateless address configuration<br>Bit 12: IPv6 stateful address configuration (DHCPv6)<br>Bit 13: IPv6 manual configuration<br>Bits 14-31: Reserved. |
| IP_MOBILITY_MGMT | BITMAP(8) | A type to indicate the supported mobility management protocols. | 0: Mobile IPv4 with FA (FA-CoA)<br>1: Mobile IPv4 without FA (Co-located CoA)<br>2: Mobile IPv6<br>3: Mobile IPv6 with DHCPv6<br>4-7: (Reserved) |
| IP_CONFIG_STATUS | BITMAP(8) | A type to represent a status of IP address configuration methods. | Bit 0: IP configuration Method is not available<br>Bit 1: DHCP Server address is not available<br>Bit 2: FA address is not available<br>Bit 3: Access Router Address is not available<br>Bit 4: No information is provided due to accessibility of same entity (FA, Access Router, DHCP Server, etc.)<br>Bit 5-7: Reserved |
| IP_PREFIX_LEN | INTEGER(1) | A type to represent the length of an IP subnet prefix. | 0-32 for IPv4 subnet.<br>0-128 for IPv6 subnet. |
| IP_SUBNET_INFO | SEQUENE( IP_PREFIX_LEN, IP_ADDRESS)) | A type to represent an IP subnet. The IP_PREFIX_LEN contains the bit length of the prefix of the subnet to which the IP_ADDRESS belongs. | N/A |
| IP_RENEWAL_FLAG | BOOLEAN | A type to represent whether MN's IP address needs to be changed or not. | TRUE: Change Required<br>FALSE: Change Not required |

Data Types used for Information Service:
Data Types used by Information Elements:
The data types defined in this section are used only by IEs.

| Type Name | Derived From | Definition | Valid Range |
|---|---|---|---|
| NETWORK_TYPE | SEQUENCE( LINK_TYPE, CHOICE(BITMAP(64), NULL)) | A type to represent a network type. See Table M5. The BITMAP(64) assignment depends on the LINK_TYPE. | |

TABLE M5

Valid Range of NETWORK_TYPE
[Move Table 9 of D05 here].

| Type Name | Derived From | Definition | Valid Range |
|---|---|---|---|
| OPERATOR_ID | SEQUENCE( OPERATOR_NS, OPERATOR_NAMESPACE) | A type to represent an operator identifier. | See below. |
| OPERATOR_NAMESPACE | INTEGER(1) | A type to represent a type of operator name. | 0: GSM/UMTS<br>1: CDMA<br>2: REALM (as defined in [30]).<br>3: ITU-T/TSB<br>4-255: (Reserved) |
| OPERATOR_NAME | OCTET_STRING | A type to represent a operator name. The value uniquely | The value is a non NULL terminated string whose length shall not exceed 253 octets. |

TABLE M5-continued

Valid Range of NETWORK_TYPE
[Move Table 9 of D05 here].

| Type Name | Derived From | Definition | Valid Range |
|---|---|---|---|
| | | identifies the operator name within the scope of the OPERATOR_NS. | |
| SERVICE_PROVIDER_ID | OCTET_STRING | A type to represent a service provider identifier. | A non-NULL terminated string whose length shall not exceed 253 octets. |
| ACCESS_NETWORK_ID | OCTET_STRING | A type to represent a network identifier. | A non-NULL terminated string whose length shall not exceed 253 octets. |
| NETWORK_SYSTEM_ID | OCTET_STRING | A type to represent a network system identifier. | A string value identifying the SSID established to use for association. |
| ROAMING_PARTNERS | LIST(OPERATOR_ID) | A type to represent a list of roaming partners. | N/A |
| COST | SEQUENCE( COST_UNIT, COST_VALUE, COST_CURRENCY) | A type to represent a cost. | N/A |
| COST_UNIT | ENUMERATED | A type to represent the unit of a cost. | 0: second<br>1: minute<br>2: hours<br>3: day<br>4: week<br>5: month<br>6: year<br>7: free<br>8: flat rate<br>9-255: (Reserved) |
| COST_VALUE | SEQUENCE( INTEGER(4), INTEGER(2)) | A type to represent the value of a cost, | The first 4-octet contains the integer part of the cost. The last 2-octet contains the fraction part where it represents a 3-digit fraction. Therefore, the value range of the fraction part is [0, 999]. For example, for a value of "0.5", the integer part is zero and the fraction part is 500. |
| COST_CURRENCY | CHAR(3) | A type to represent the currency of a cost. | A three-letter currency code (e.g., "USD") specified by ISO 4217 [ISO 4217]. |
| NETWORK_QOS | SEQUENCE( LINK_TYPE, LIST(QOS_PARAM)) | A type to represent a list of QoS parameters of a specific link type. | N/A |
| DATA_RATE | INTEGER(4) | A type to represent the maximum data rate in Kbps. | $0 - 2^{32} - 1$ |
| NETWORK_CAPABILITIES | BITMAP(32) | A type to represents a set of network capabilities. | Bit 0: Security<br>Bit 1: QoS<br>Bit 2: Internet Access<br>Bit 3: Emergency Services<br>Bit 4: MIH Capability<br>Bit 5-31: Reserved |

Data Types for Information Service Query:

| Type Name | Derived From | Definition | Valid Range |
|---|---|---|---|
| INFO_QUERY_BINARY_DATA | SEQUENCE( CHOICE( QUERIER_LOCATION, NULL), CHOICE( NETWORK_TYPE_INCLUSION, NULL), CHOICE( NETWORK_INCLUSION, NULL), CHOICE( REPORTING_TEMPLATE, NULL), CHOICE( | A type to represent a binary query data. If the CURRENCY is included, the currency indicated in the CURRENCY shall be used for Cost IEs carried in an INFO_RESP_BINARY. See below for the processing rule of QUERIER_LOCATION, NETWORK_INCLUSION, NETWORK_INCLUSION, | N/A |

-continued

| Type Name | Derived From | Definition | Valid Range |
|---|---|---|---|
| | REPORT_LIMITATION, NULL), CHOICE( COST_CURRENCY, NULL)) | REPORTING_TEMPLATE and REPORT_LIMITATION. | |
| QUERIER_LOCATION | SEQUENCE( CHOICE( LOCATION, NULL), CHOICE( MAC_ADDRESS, NULL), CHOICE( NEIGHBORHOOD_RADIUS, NULL)) | A type to represent a querier's location. It is not valid to use both LOCATION and MAC_ADDRESS at the same time. | N/A |
| NETWORK_TYPE_INCLUSION | BITMAP(64) | A type to represent a set of link types. | The value is a 4 octet bitmap: Bit 0: Wireless - GSM Bit 1: Wireless - GPRS Bit 2: Wireless - EDGE Bit 3: IEEE 802.3 (Ethernet) Bit 4: Wireless - Other Bit 5: Wireless - IEEE 802.11 Bit 6: Wireless - CDMA2000 Bit 7: Wireless - UMTS Bit 8: Wireless - cdma2000-HRPD Bit 9: Wireless - IEEE 802.16 Bit 10: Wireless - IEEE 802.20 Bit 11: Wireless - IEEE 802.22 Bit 12-31: (Reserved AND shall not be used and shall be always set to "0") |

NETWORK_TYPE_INCLUSION, if provided in the query, is used to indicate the neighboring network types the querier wants to include in the response. The querier indicates the network types it wants to include in the query response by setting the corresponding bits to "1". If not provided, the Information Server shall include all available network types in the query response.

| Type Name | Derived From | Definition | Valid Range |
|---|---|---|---|
| NETWORK_INCLUSION | LIST(ACCESS_NETWORK_ID) | A type to represent a list of network identifiers. | N/A |

NETWORK_INCLUSION, if provided in the query, is used to indicate the specific access networks the querier wants to include in the query response. If not provided, the Information Server shall include all available access networks in the query response.

| Type Name | Derived From | Definition | Valid Range |
|---|---|---|---|
| REPORTING_TEMPLATE | LIST(IE_TYPE) | A type to represent a list of IE types. Inclusion of any IE type is optional. | N/A. |
| IE_TYPE | INTEGER(4) | A type to represent an IE type. | See Table C-1. |

REPORTING_TEMPLATE, if present, it indicates to the information server a template of the list of IEs which shall be included in the information response.

Rules for Using REPORTING_TEMPLATE.

1) If the REPORTING_TEMPLATE is absent, the entire list of neighboring networks container shall be returned in the response.
2) If a container is listed without any of its component IEs, the entire container shall be returned in the response.

For example, inclusion of TYPE_IE_CONTAINER_POA solely returns a list of PoA Containers with all their component IEs.

3) if a container is listed with one or more of its component IEs, the container with only the listed component IEs shall be returned. For example, inclusion of TYPE_IE_CONTAINER_NETWORK, TYPE_IE_NETWORK_TYPE and TYPE_IE_OPERATOR_I-

DENTIFIER solely returns a list of Network Containers with each containing only Network Type and Operator ID.

4) If a component IE is listed without its parent container, the listed component IE shall be returned as an individual IE. For example, inclusion of TYPE_IE_NETWORK_TYPE and TYPE_IE_COST solely returns a list of Network Types and a list of Costs. Note, a list of individual IEs out of their context may have very limited usefulness. This is only an example to show the flexible use of Reporting Template.

| Type Name | Derived From | Definition | Valid Range |
| --- | --- | --- | --- |
| REPORT_LIMITATION | SEQUENCE( INTEGER(2), INTEGER(2)) | A type to represent a report limitation. The first INTEGER(2) contains the maximum number of IEs in the INFO_RESPONSE_BINARY_DATA. The second INTEGER(2) contains the starting entry number (offset = 1 points to the first entry) from which a chunk of entries are to be included in the INFO_QUERY_BINARY_DATA. It is assumed that the IS server generates the same ordered list of entries for queries from the same IS client with the same INFO_RESPONSE_BINARY_DATA content (except for REPORT_LIMITATION) before the limitation on the REPORT_LIMITATION is applied. | N/A |
| INFO_RESPONSE_BINARY_DATA | LIST( INFORMATION_ELEMENT ) | A type to represent a binary query response data. | N/A |

Rules for Generating Returned IEs:

Upon receipt of a binary query, the information server will:

1) create the list of neighboring access network information for the given location;

If a NETWORK_TYPE_INCLUSION is provided in the query, include only the information of the neighboring access networks of the network type(s) indicated in the NETWORK_TYPE_INCLUSION. Otherwise, include information of all available neighboring access networks for the given location.

If a NETWORK_INCLUSION is provided in the query, include only the information of the neighboring access network(s) indicated in the NETWORK_INCLUSION. Otherwise, include information of all available neighboring access networks for the given location.

2) if no REPORTING_TEMPLATE is given in the query, send the list of neighboring access network information in a List of Neighboring Access Networks Container in an Information Response.

3) if a REPORTING_RESPONSE is given in the query, extract the requested IE(s)/Containers from the list of neighboring access network information using the REPORTING_TEMPLATE processing rules describe above and send them in an Information Response.

| Type Name | Derived From | Definition | Valid Range |
| --- | --- | --- | --- |
| MIME_TYPE | OCTET_STRING | A type to represent a MIME type. When the MIME type is "application/sparql-results+xml", this field contains XML text. | N/A |
| INFO_QUERY_RDF_DATA | SEQUENCE( CHOICE(MIME_TYPE, NULL), OCTET_STRING) | A type to present a RDF data query. If MIME_TYPE is not contained, MIME type "application/sparql-results+xml" is used. Each OCTET_STRING is formatted with the MIME type. | N/A |
| INFO_QUERY RDF_SCHEMA | OCTET_STRING | A type to represent the URL of an RDF schema to obtain. | N/A |

-continued

| Type Name | Derived From | Definition | Valid Range |
|---|---|---|---|
| INFO_RESPONSE_RDF_DATA | SEQUENCE( CHOICE(MIME_TYPE, NULL), OCTET_STRING) | A type to present a RDF data query. If MIME_TYPE is not contained, MIME type "application/sparql-results+xml" is used, the OCTET_STRING is formatted with the MIME type. | N/A |
| INFO_RESP_SCHEMA_URL | OCTET_STRING | A type to represent an URL of an RDF schema. | N/A |
| INFO_RESP_RDF_SCHEMA | SEQUENCE{ CHOICE(MIME_TYPE,NULL), OCTET_STRING) | A type to represent the content of an RDF schema. If MIME_TYPE is not contained, MIME type "application/sparql-results+xml" is used, the OCTET_STRING is formatted with the MIME type. | N/A |

Data Type for MIHF Identification:

| Type Name | Derived From | Definition | Valid Range |
|---|---|---|---|
| MIHF_ID | OCTET_STRING | A type for presenting an MIHF Identifier (see definition in 8.3.1). | N/A |

Data Type for Event Subscription Identification:

| Type Name | Derived From | Definition | Valid Range |
|---|---|---|---|
| SUBSCRIPTION_ID | INTEGER(2) | A type for representing the identifier for a remote event subscription. | N/A |

Data Types for MIH Capabilities:

| Type Name | Derived From | Definition | Valid Range |
|---|---|---|---|
| MIH_EVENT_LIST | BITMAP(32) | A type to represent a set of MIH events. | Bit 0: MIH_Link_Up<br>Bit 1: MIH_Link_Down<br>Bit 2: MIH_Link_Going_Down<br>Bit 3: MIH_Link_Detected<br>Bit 4: MIH_Link_Parameters_Report<br>Bit 5: MIH_Link_Event_Rollback<br>Bit 6: MIH_Link_PDU_Transmit_Status<br>Bit 7: MIH_Link_Handover_Imminent<br>Bit 8: MIH_Link_Handover_Complete<br>Bit 9-31: (Reserved) |
| MIH_COMMAND_LIST | BITMAP(32) | A type to represent a set of MIH commands. | Bit 0: MIH_Get_Link_Parameters<br>Bit 1: MIH_Configure_Link<br>Bit 2: MIH_Scan<br>Bit 3: MIH_Net_HO_Candidate_Query<br>MIH_Net_HO_Commit<br>MIH_N2N_HO_Query_Resources<br>MIH_N2N_HO_Complete<br>Bit 4: MIH_MN_HO_Candidate_Query<br>MIH_MN_HO_Commit<br>MIH_MN_HO_Complete<br>Bit 5-31: (Reserved) |
| MIH_IS_QUERY_TYPE_LIST | BITMAP(8) | A type to represent a set of MIH IS query types. | Bit 0: TLV<br>Bit 1: RDF_DATA<br>Bit 2: RDF_SCHEMA_URL<br>Bit 3: RDF_SCHEMA<br>Bit 4-7: (Reserved) |
| MIH_TRANSPORT_LIST | BITMAP(32) | A type to represent a set of MIH transport list. | Bit 0: L2 for service management<br>Bit 1: L3 or higher layer protocol for service management<br>Bit 4: L2 for event service<br>Bit 5: L3 or higher layer protocol for event service<br>Bit 8: L2 for command service<br>Bit 9: L3 or higher layer protocol for command service<br>Bit 12: L2 for information service |

-continued

| Type Name | Derived From | Definition | Valid Range |
|---|---|---|---|
| | | | Bit 13: L3 or higher layer protocol for information service<br>Other Bits: (Reserved) |

Data Type for MIH Registration:

| Type Name | Derived From | Definition | Valid Range |
|---|---|---|---|
| REG_REQUEST_CODE | ENUMERATED | A type to represent a registration request code. | 0 - Registration<br>1 - Re-Registration<br>[Editor's note: Re-registration scope to be defined.] |

Data Types for Handover Operation:

| Type Name | Derived From | Definition | Valid Range |
|---|---|---|---|
| HANDOVER_TYPE | BOOLEAN | A type to represent a handover type. | FALSE: Intra-technology<br>TRUE: Inter-technology |
| HANDOVER_MODE | ENUMERATED | A type to represent a handover mode. | 0 Make-before-Break<br>1 Break-before-Make |
| HANDOVER_ACK | BOOLEAN | A type to represent a handover acknowledgment. | TRUE: Initiate Handover<br>FALSE: Abort Handover |
| HANDOVE_QUERY_RESOURCE | BITMAP(8) | A type to represent a set of resource types to query. | Bit 0: Maximum Bandwidth<br>Bit 1-7: (Reserved) |
| HANDOVER_RESULT | ENUMERATED | A type to represent a handover result. | 0: Success<br>1: Failure<br>2: Rejected |

Data Types for MIH_NET SAP Primitives:

| Type Name | Derived From | Definition | Valid Range |
|---|---|---|---|
| TRANSPORT_TYPE | ENUMERATED | A type to represent a transport type. | 0: L2<br>1: L3 or higher layer protocol |

Data Types for MIH_NMS SAP Primitives:
This can be established by those in the art based on this disclosure.
Undefined Data Types:
Can be defined by those in the art based on this disclosure.

| Type Name |
|---|
| NETWORK_SECURITY<br>ERROR_CODE<br>NON_QOS_TYPE<br>NON_QOS_PARAM<br>RESOURVE_SET<br>AVAILABLE_RESOURCE_LIST<br>NMS_STATE_REQ<br>NMS_STATE_RESP |

Changes to Section 8 of 802.21 Draft Document

In some embodiments, Section 8 of said 802.21 Draft document can be modified to replace reference to TLV type values with reference to TLV type names. For example, a MIH_Capability_Discover request message format should look like:

| MIH Header Fixed Fields (SID = 1, Opcode = 1, AID = 1) |
|---|
| Source Identifier = sending MIHF ID<br>(SOURCE MIHF ID TLV) |
| Destination Identifier = receiving MIHF ID<br>(DESTINATION MIHF ID TLV) |
| SupportedMihEventList<br>(MIH EVENT LIST TLV) |
| SupportedMihCommandList<br>(MIH COMMAND LIST TLV) |
| SupportedISQueryTypeList<br>(MIH IS QUERY TYPE LIST TLV) |
| SupportedTransportList<br>(TRANSPORT OPTION LIST TLV) |

For reference, the mapping between attribute names in MIH message format and actual TLV Type name is provided below.

| Attribute Name in Message Format | TLV Type Name |
|---|---|
| Source Identifier | SOURCE MIHF ID |
| Destination Identifier | DESTINATION MIHF ID |
| Subscription Identifier | SUBSCRIPTION ID |
| SupportedMihEventList | MIH EVENT LIST |
| SupportedMihCommandList | MIH COMMAND LIST |
| SupportedISQueryTypeList | MIH IS QUERY TYPE LIST |
| SupportedTransportList | TRANSPORT OPTION LIST |
| RequestCode | REQUEST CODE |
| ValidityPeriod | VALIDITY PERIOD |
| Status | STATUS |
| LinkIdentifier | LINK ID |
| MacOldAccessRouter | MAC OLD ACCESS ROUTER |
| MacNewAccessRouter | MAC NEW ACCESS ROUTER |
| IPRenewalFlag | IP RENEWAL FLAG |
| MobilityManagementSupport | MOBILITY MGMT SUPPORT |
| IPConfigurationMethods | IP ADDRESS CONFIG METHOD |
| LinkDownReasonCode | LINK DOWN REASON CODE |
| TimeInterval | TIME INTERVAL |
| ConfidenceLevel | CONFIDENCE LEVEL |
| LinkGoingDownReason | LINK GOING DOWN REASON |
| UniqueEventIdentifier | UNIQUE EVENT IDENTIFIER |
| MIHCapabilityFlag | MIH CAPABILITY FLAG |
| LinkParameterReport | LINK PARAMETER REPORT |
| HandoverType | HANDOVER TYPE |
| OldLinkIdentifier | LINK IDENTIFIER |
| NewLinkIdentifier | NEW LINK IDENTIFIER |
| TargetLinkIdentifier | LINK IDENTIFIER |
| GetStatusRequestSet | GET STATUS REQUEST SET |
| GetStatusResponseSet | GET_STATUS_RESPONSE_SET |
| ConfigureRequestSet | CONFIGURE REQUEST SET |
| ConfigurationResponseList | CONFIGURE_RESPONSE SET |
| ScanLinkIdentifier | SCAN LINK IDENTIFIER |
| ScanResponseSets | SCAN RESPONSE SET |
| SuggestedNewLink 1 . . . k | LIST OF LINK POA LIST (Note: bundled into a single TLV) |
| HandoverMode | HANDOVER MODE |
| OldLinkActions | LINK ACTIONS |
| QueryResourceList | QUERY RESOURCE LIST |
| RequestedResourceSet | REQUESTED RESOURCE SET |
| CurrentLinkIdentifier | LINK IDENTIFIER |
| PreferredLink 1 . . . k | LIST OF LINK POA LIST (Note: bundled into a single TLV) |
| PreferredCandidateLink 1 . . . k | LIST OF LINK POA LIST (Note: bundled into a single TLV) |
| HandoverAck | HANDOVER ACK |
| ServingFAAdress | FA ADDRESS |
| ServingAccessRouterAddress | AR ADDRESS |
| DHCPServerAddress | DHCP SERVER ADDRESS |
| IPAddressInformationStatus | IP ADDRESS INFO STATUS |
| ResourceStatus | RESOURCE STATUS |
| AvailableResourceSet | AVAILABLE RESOURCE SET |
| LinkActionSet 1 . . . k | LINK ACTION SET LIST (Note: bundled into a single TLV) |
| LinkActionResult 1 . . . k | LINK ACTION RESULT LIST (Note: bundled into a single TLV) |
| HandoverResult | HANDOVER RESULT |
| ResourceRetainStatus | RESOURCE RETENTION STATUS |
| InfoQueryBinary (0 to k) | INFO QUERY BINARY LIST (Note: bundled into a single TLV) |
| InfoQueryRDFData (0 to k) | INFO QUERY RDF DATA LIST (Note: bundled into a single TLV) |
| InfoQueryRDFSchemaURL (0 to k) | INFO QUERY RDF SCHEMA URL (Note: bundled into a single TLV) |
| InfoQueryRDFSchema (0 to k) | INFO QUERY RDF SCHEMA LIST (Note: bundled into a single TLV) |
| MaxResponseSize | MAX RESPONSE SIZE |
| InfoResponseBinary (0 to k) | INFO RESP BINARY LIST (Note: bundled into a single TLV) |
| InfoResponseRDFData (0 to k) | INFO RESP RDF DATA LIST (Note: bundled into a single TLV) |
| InfoResponseRDFSchemaURL (0 to k) | INFO RESP RDF SCHEMA URL LIST (Note: bundled into a single TLV) |
| InfoResponseRDFSchema (0 to k) | INFO RESP RDF SCHEMA LIST (Note: bundled into a single TLV) |

A New Annex for TLV Table:
According to some embodiments, a new Annex for a List of TLVs can be provided as follows.

| | List of TLVs | | |
|---|---|---|---|
| TLV Type Name | TLV Type Value | TLV Value Data Type | Defined Annex |
| SOURCE MIHF ID | 0 | MIHF_ID | M.2.8 |
| DESINTATION MIHF ID | 1 | MIHF_ID | M.2.8 |
| SUBSCRIPTION ID | 2 | SUBSCRIPTION_ID | M.2.9 |

List of TLVs

| TLV Type Name | TLV Type Value | TLV Value Data Type | Defined Annex |
|---|---|---|---|
| STATUS | 3 | ENUMERATED | M.2.1 |
| MIH EVENT LIST | 4 | MIH_EVENT_LIST | M.2.10 |
| MIH COMMAND LIST | 5 | MIH_COMMAND_LIST | M.2.10 |
| MIH IS QUERY TYPE LIST | 6 | MIH_IS_QUERY_TYPE_LIST | M.2.10 |
| TRANSPORT OPTION LIST | 7 | MIH_TRANSPORT_LIST | M.2.10 |
| REQUEST CODE | 8 | REG_REQUEST_CODE | M.2.11 |
| VALIDITY PERIOD | 9 | INTEGER(4) | M.2.1 |
| LINK IDENTIFIER | 10 | LINK_TUPLE_ID | M.2.3 |
| NEW LINK IDENTIFIER | 11 | LINK_TUPLE_ID | M.2.3 |
| MAC OLD ACCESS ROUTER | 12 | MAC_ADDRESS | M.2.5 |
| MAC NEW ACCESS ROUTER | 13 | MAC_ADDRESS | M.2.5 |
| IP RENEWAL FLAG | 14 | IP_RENEWAL_FLAG | M.2.6 |
| MOBILITY MGMT SUPPORT | 15 | IP_MOBILITY_MGMT | M.2.6 |
| IP ADDRESS CONFIG METHOD | 16 | IP_CONFIG_METHODS | M.2.6 |
| LINK DOWN REASON CODE | 17 | LINK_DOWN_REASON | M.2.3 |
| TIME INTERVAL | 18 | INTEGER(2) | M.2.1 |
| CONFIDENCE LEVEL | 19 | PERCENTAGE | M.2.1 |
| LINK GOING DOWN REASON | 20 | LINK_GOING_DOWN_REASON | M.2.3 |
| UNIQUE EVENT IDENTIFIER | 21 | INTEGER(2) | M.2.1 |
| MIH CAPABILITY FLAG | 22 | LINK_MIH_CAPABILITY_FLAG | M.2.3 |
| LINK PARAMETER REPORT | 23 | LIST(LINK_PARAM) | M.2.3 |
| HANDOVER TYPE | 24 | HANDOVER_TYPE | M.2.12 |
| GET STATUS REQUEST SET | 25 | LINK_STATUS_REQ | M.2.3 |
| GET_STATUS_RESPONSE_SET | 26 | LIST(LINK_STATUS_RESP) | M.2.3 |
| CONFIGURE REQUEST SET | 27 | LIST(LINK_CONFIG_REQ) | M.2.3 |
| CONFIGURE_RESPONSE SET | 28 | LIST(LINK_CONFIG_STATUS) | M.2.3 |
| SCAN LINK IDENTIFIER | 29 | LINK_ID | M.2.3 |
| SCAN RESPONSE SET | 30 | LIST(LINK_SCAN_RESP) | M.2.3 |
| LIST OF LINK POA LIST | 31 | LIST(LINK_POA_LIST) | M.2.3 |
| HANDOVER MODE | 32 | HANDOVER_MODE | M.2.12 |
| LINK ACTIONS | 33 | LINK_ACTIONS | M.2.3 |
| REQUESTED RESOURCE SET | 34 | LINK_RESOURCE_SET | M.2.3 |
| QUERY RESOURCE LIST | 35 | QUERY_RESOURCE_LIST | M.2.3 |
| HANDOVER ACK | 36 | HANDOVER_ACK | M.2.12 |
| AR ADDRESS | 37 | IP_ADDRESS | M.2.6 |
| DHCP SERVER ADDRESS | 38 | IP_ADDRESS | M.2.6 |
| FA ADDRESS | 39 | IP_ADDRESS | M.2.6 |
| IP ADDRESS INFO STATUS | 40 | IP_CONFIG_STATUS | M.2.6 |
| LINK ACTION SET | 41 | LIST(LINK_ACTION_REQ) | M.2.3 |
| LINK ACTION RESULT | 42 | LIST(LINK_ACTION_RESP) | M.2.3 |
| HANDOVER RESULT | 43 | HANDOVER_RESULT | M.2.12 |
| RESOURCE STATUS | 44 | LINK_RESOURCE_STATUS | M.2.3 |
| AVAILABLE RESOURCE SET | 45 | LIST(LINK_RESOURCE_SET) | M.2.3 |
| RESOURCE RETENTION STATUS | 46 | LINK_RESOURCE_RETENTION_STATUS | M.2.3 |
| INFO QUERY BINARY LIST | 47 | LIST(INFO_RESP_BINARY_DATA) | M.2.7.2 |
| INFO QUERY RDF DATA LIST | 48 | LIST(INFO_QUERY_RDF_DATA) | M.2.7.2 |
| INFO QUERY RDF SCHEMA URL | 49 | NULL | M.2.7.2 |
| INFO_QUERY_RDF SCHEMA LIST | 50 | LIST(INFO_QUERY_RDF_SCHEMA) | M.2.7.2 |
| MAX RESPONSE SIZE | 51 | INTEGER(2) | M.2.1 |
| INFO RESP BINARY LIST | 52 | LIST(INFO_RESP_BINARY_DATA) | M.2.7.1 |
| INFO RESP RDF DATA LIST | 53 | LIST(INFO_RESP_RDF_DATA) | M.2.7.2 |
| INFO RESP RDF SCHEMA URL LIST | 54 | LIST(INFO_RESP_SCHEMA_URL) | M.2.7.2 |
| INFO_RESP RDF SCHEMA LIST | 55 | LIST(INFO_RESP_RDF_SCHEMA) | M.2.7.2 |

Information Elements Supported By 802.21:

For reference, FIG. 6 shows a partial list of Information Elements that can be supported by the IEEE 802.21 standard. The value of each Information Element has an abstract data type for which semantics and binary encoding are defined in the noted Annex. The TLV representation of these Information Elements is described in section 6.4.6 of the 802.21 draft document. Another way of representing these IEs using RDF is described in 6.4.7.1 of the 802.21 draft document. The IEs may be retrieved using TLV or resource description framework (RDF) based query mechanism.

SAP Primitives and Parameter Types:

SAPs are defined as a set of primitives. Taken together, the primitives define the services. Within the definition of each primitive, there is a table of allowable parameters. Each parameter is defined using abstract data types. These types indicate the semantic value of that parameter. The parameters defined within the clause for a particular primitive are produced or consumed by that primitive. Several of the abstract data types are used in multiple primitive definitions. In each abstract data type definition, the various names applied to this type are listed. Most of the primitives have corresponding MIH protocol messages. In those messages, there are TLV encoded parameters that implement the primitive parameter abstract data types within the protocol. The definition of the full binary encoding for each of these instantiations is set forth in the Annex.

In some embodiments, the "Semantics of Service Primitive" section of the 802.21 draft standard is changed such that each primitive definition section is as set forth below:

7.3.1.1.2 Semantics of service primitive
The primitive parameters are as follows:
Link_Event_Subscribe.request (
RequestedLinkEventList
Parameters:

| Name | Type | Description |
|---|---|---|
| Requested Link Event List | LINK_EVENT_LIST | List of link layer events that the endpoint would like to receive indications for, from the Event Source. |

7.3.1.2.2 Semantics of service primitive
The primitive parameters are as follows:
Link_Event_Subscribe.confirm (
ResponseLinkEventList,
Status
)
Parameters:

| Name | Type | Description |
|---|---|---|
| Response Link Event List | LINK_EVENT_LIST | List of link layer events along with their subscription status. |
| Status | STATUS | Status of operation. |

7.3.2.1.2 Semantics of service primitive
The primitive parameters are as follows:
Link_Event_Unsubscribe.request (
RequestedLinkEventList
)
Parameters:

| Name | Type | Description |
|---|---|---|
| Requested Link Event List | LINK_EVENT_LIST | List of link layer events for which indications need to be unsubscribed from the Event Source. |

7.3.1.2.2 Semantics of service primitive
The primitive parameters are as follows:
Link_Event_Unsubscribe.confirm (
ResponseLinkEventList,
Status
)
Parameters:

| Name | Type | Description |
|---|---|---|
| Response Link Event List | LINK_EVENT_LIST | List of link layer events along with their subscription status. |
| Status | STATUS | Status of operation. |

7.3.3.1.2 Semantics of service primitive
The primitive parameter is as follows:
Link_Configure_Thresholds.request (
LinkConfigureParameterList
)
Parameters:

| Name | Type | Description |
|---|---|---|
| Link Configure Parameter List | LIST(LINK_PARAM) | A list of Link Configure Parameter. |
| Status | STATUS | Status of operation. |

7.3.3.2.2 Semantics of service primitive
The primitive parameters are as follows:
Link_Configure_Thresholds.confirm (
LinkConfigureStatusList,
Status
)
Parameters:

| Name | Type | Description |
|---|---|---|
| Link Configure Status List | LIST(LINK_CONFIG_STATUS) | A list of Link Configure Status. |
| Status | STATUS | Status of operation. |

7.3.4.2 Semantics of service primitive
The primitive parameters are as follows:
Link_Up.indication (
LinkIdentifier,
MacOldAccessRouter,
MacNewAccessRouter,
IPRenewalFlag,
Mobility Management Support
)
Parameters:

| Name | Type | Description |
|---|---|---|
| Link Identifier | LINK_TUPLE_ID | Identifier of the link associated with the event. |
| MAC Old Access Router | MAC_ADDRESS | (Optional) MAC Address of old Access Router. |
| MAC New Access Router | MAC_ADDRESS | (Optional) MAC Address of new Access Router. |
| IP Renewal Flag | IP_RENEWAL_FLAG | (Optional) Indicates whether the MN shall change IP Address in the new PoA. |
| Mobility Management Support | MOBILITY_MGMT | (Optional) Indicates the type of Mobility Management Protocol supported by the new PoA. |

7.3.5.2 Semantics of service primitive
Link_Down.indication (
LinkIdentifier,
MacOldAccessRouter,
ReasonCode
)
Parameters:

| Name | Type | Description |
|---|---|---|
| Link Identifier | LINK_TUPLE_ID | Identifier of the link associated with the event. |
| MAC Old Access Router | MAC_ADDRESS | (Optional) MAC Address of old Access Router. |
| Reason Code | LINK_DOWN_REASON_CODE | Reason for why the link went down. |

7.3.6.2 Semantics of service primitive
Link_Going_Down.indication (
LinkIdentifier,
TimeInterval,
ConfidenceLevel,
LinkGoingDownReason,
UniqueEventIdentifier
)
Parameters:

| Name | Type | Description |
|---|---|---|
| Link Identifier | LINK_TUPLE_ID | Identifier of the link associated with the event. |
| Time Interval | INTEGER(2) | Time Interval (in milliseconds) in which the link is expected to go down. The link connectivity is expected to be available at least for time specified by TimeInterval. |
| Confidence Level | PERCENTAGE | The confidence level (%) for link to go down within the specified time interval. |
| Link Going Down Reason | LINK_DOWN_REASON | The reason for why the link is going to be down. |
| Reason Code | LINK_GOING_DOWN_REASON | Reason for why the link went down. |
| Unique Event Identifier | INTEGER(2) | Used to uniquely identify the event. To be used in case of event rollback. |

7.3.7.2 Semantics of service primitive
The primitive parameters are as follows:
Link_Event_Rollback.indication (
LinkIdentifier,
UniqueEventIdentifier
)
Parameters:

| Name | Type | Description |
|---|---|---|
| Link Identifier | LINK_TUPLE_ID | Identifier of the link associated with the event. |
| Unique Event Identifier | INTEGER(2) | Used to identify the event which needs to be rolled back. |

7.3.8.2 Semantics of service primitive
The primitive parameters are as follows:
Link_Detected.indication (
LinkIdentifier,
MIHCapabilityFlag
)
Parameters:

| Name | Type | Description |
|---|---|---|
| Link Identifier | LINK_TUPLE_ID | Identifier of the link associated with the event. |
| MIH Capability Flag | LINK_MIH_CAPABILITY_FLAG | Used to indicate whether the link supports MIH capability. |

7.3.9.2 Semantics of service primitive
Link_Parameters_Report.indication(
LinkIdentifier,
LinkParametersReportList
)

-continued

Parameters:

| Name | Type | Description |
|---|---|---|
| Link Identifier | LINK_TUPLE_ID | Identifier of the link associated with the event. |
| Link Parameters Report List | LIST(LINK_PARAM) | A list of Link Parameter Report. |

7.3.10.2 Semantics of service primitive
The primitive parameters are as follows:
Link_PDU_Transmit_Status.indication (
LinkIdentifier,
PacketIdentifier,
TransmissionStatus
)
Parameters:

| Name | Type | Description |
|---|---|---|
| Link Identifier | LINK_TUPLE_ID | Identifier of the link associated with the event. |
| Packet Identifier | INTEGER(2) | Identifier for higher layer data packet that was delivered successfully. |
| Transmission Status | BOOLEAN | Status of transmission of the packet. TRUE: Success FALSE: Failure |

7.3.11.2 Semantics of service primitive
The primitive parameters are as follows:
Link_Handover_Imminent.indication (
LinkIdentifier,
MacOldAccessRouter,
MacNewAccessRouter
)

-continued

Parameters:

| Name | Type | Description |
|---|---|---|
| Link Identifier | LINK_TUPLE_ID | Identifier of the link associated with the event. |
| Mac Old Access Router | MAC_ADDRESS | (Optional) MAC Address of old and Access Router. |
| Mac New Access Router | MAC_ADDRESS | (Optional) MAC Address of new Access Routers. |

7.3.13.2.2 Semantics of service primitive
The primitive parameters are as follows:
Link_Capability_Discover.confirm (
SupportedLinkEventList,
SupportedLinkCommandList,
Status
)
Parameters:

| Name | Type | Description |
|---|---|---|
| Supported Link Event List | LINK_EVENT_LIST | List of link layer events supported by the link layer. |
| Supported Link Command List | LINK_COMMAND_LIST | List of link layer commands supported by the link layer. |
| Status | STATUS | Status of operation. |

7.3.14.1.2 Semantics of service primitive
The primitive parameter is as follows:
Link_Get_Parameters.request (
LinkParametersRequest
)
Parameters:

| Name | Type | Description |
|---|---|---|
| Link Parameters Request | LINK_PARAM_TYPE | A bitmap representing the list of link parameters for which status is requested. |

7.3.14.2.2 Semantics of service primitive
The primitive parameters are as follows:
Link_Get_Parameters.confirm (
LinkParametersStatusList,
Status
)
Parameters:

| Name | Type | Description |
|---|---|---|
| Link Parameters Status List | LIST(LINK_PARAM) | A list of QoS Parameters. |
| Status | STATUS | Status of operation. |

7.3.15.1.2 Semantics of Service Primitive
The parameters of the service primitive are as follows:
Link_Action.request (
LinkIdentifier
LinkAction
ExecutionTime
)

| Name | Type | Description |
|---|---|---|
| Link Identifier | LINK_TUPLE_ID | Identifier of present link |
| Link Actions | LINK_ACTIONS | Specifies the suggested action on link during handover. |
| Execution Time | INTEGER(2) | Time (in ms) elapsed before action needs to be taken, if Execution Time = 0 then the action is expected to be taken on receipt of this command. |

7.3.15.2.2 Semantics of Service Primitive
The parameters of the service primitive are as follows:
Link_Action.confirm (
ScanResponseSet,
Status
)

| Name | Type | Description |
|---|---|---|
| Scan Response Sets | LINK_SCAN_RESP | (Optional) A list of discovered links and related information. |
| Status | STATUS | Status of operation. |

7.4.1.1.2 Semantics of service primitive
MIH_Capability_Discover.request (
DestinationIdentifier,
SupportedMihEventList,
SupportedMihCommandList,
SupportedIsQueryTypeList,
SupportedTransportList
)

| Name | Type | Description |
|---|---|---|
| Destination Identifier | MIHF_ID | [Same as D5] |
| Supported MIH Event List | MIH_EVENT_LIST | (Optional) List of supported events on MIHF. |
| Supported IS Query Type List | MIH_IS_QUERY_TYPE_LIST | (Optional) List of supported MIIS query types. |
| Supported TransportList | MIH_TRANSPORT_LIST | (Optional) List of supported transport types. |

7.4.1.2.2 Semantics of Service primitive
MIH_Capability_Discover.indication (
SourceIdentifier,
SupportedMihEventList,
SupportedMihCommandList,
SupportedIsQueryTypeList,
SupportedTransportList
)

| Name | Type | Description |
|---|---|---|
| Source Identifier | MIHF_ID | [Same as D5] |
| Supported MIH Event List | MIH_EVENT_LIST | (Optional) List of supported events on MIHF. |
| Supported IS Query Type List | MIH_IS_QUERY_TYPE_LIST | (Optional) List of supported MIIS query types. |
| Supported TransportList | MIH_TRANSPORT_LIST | (Optional) List of supported transport types. |

7.4.1.3.1 Semantics of Service primitive
MIH_Capability_Discover.response(
DestinationIdentifier,
SupportedMihEventList,
SupportedMihCommandList,
SupportedIsQueryTypeList,
SupportedTransportList,
Status
)

| Name | Type | Description |
|---|---|---|
| Destination Identifier | MIHF_ID | [Same as D5] |
| Supported MIH Event List | MIH_EVENT_LIST | (Optional) List of supported events on MIHF. |
| Supported IS Query Type List | MIH_IS_QUERY_TYPE_LIST | (Optional) List of supported MIIS query types. |
| Supported TransportList | MIH_TRANSPORT_LIST | (Optional) List of supported transport types. |
| Status | STATUS | Status of operation. |

7.4.1.4.2 Semantics of service primitive
MIH_Capability_Discover.confirm (
SourceIdentifier,
SupportedMihEventList,
SupportedMihCommandList,
SupportedIsQueryTypeList,
SupportedTransportList,
Status
)

| Name | Type | Description |
|---|---|---|
| Source Identifier | MIHF_ID | [Same as D5] |
| Supported MIH Event List | MIH_EVENT_LIST | (Optional) List of supported events on MIHF. |
| Supported IS Query Type List | MIH_IS_QUERY_TYPE_LIST | (Optional) List of supported MIIS query types. |
| Supported TransportList | MIH_TRANSPORT_LIST | (Optional) List of supported transport types. |
| Status | STATUS | Status of operation. |

7.4.2.1.2 Semantics of service primitive
MIH_Register.request (
DestinationIdentifier,
RequestCode
)

| Name | Type | Description |
|---|---|---|
| Destination Identifier | MIHF_ID | [Same as D5] |
| Request Code | REG_REQUEST_CODE | Registration request code. |

7.4.2.2.2 Semantics of service primitive
MIH_Register.indication (
SourceIdentifier,
RequestCode
)

| Name | Type | Description |
|---|---|---|
| Source Identifier | MIHF_ID | [Same as D5] |
| Request Code | REG_REQUEST_CODE | Registration request code. |

7.4.2.3.2 Semantics of service primitive
MIH_Register.response (
Destination Identifier,
ValidityTime,
Status
)

| Name | Type | Description |
|---|---|---|
| Destination Identifier | MIHF_ID | [Same as D5] |
| Validity Time | INTEGER(4) | [Same as D5] |
| Status | STATUS | Status of operation. |

7.4.2.4.2 Semantics of service primitive
MIH_Register.confirm (
SourceIdentifier,
ValidityTime,
Status
)

| Name | Type | Description |
|---|---|---|
| Source Identifier | MIHF_ID | [Same as D5] |
| Validity Time | INTEGER(2) | [Same as D5] |
| Status | STATUS | Status of operation. |

7.4.3.2.2 Semantics of service primitive
MIH_DeRegister.indication(
SourceIdentifier
)

| Name | Type | Description |
|---|---|---|
| Source Identifier | MIHF_ID | [Same as D5] |

MIH_DeRegister.response (
DestinationIdentifier,
Status
)

| Name | Type | Description |
|---|---|---|
| Destination Identifier | MIHF_ID | [Same as D5] |
| Status | STATUS | Status of operation. |

7.4.3.4.2 Semantics of service primitive
MIH_DeRegister.confirm (
SourceIdentifier,
Status
)

| Name | Type | Description |
|---|---|---|
| Source Identifier | MIHF_ID | [Same as D5] |
| Status | STATUS | Status of operation. |

7.4.4.1.2 Semantics of service primitive
The primitive parameters are as follows:
MIH_Event_Subscribe.request (
DestinationIdentifier,
LinkIdentifier,
RequestedMihEventList
)

| Name | Type | Description |
|---|---|---|
| Destination Identifier | MIHF_ID | [Same as D5] |
| Link Identifier | LINK_TUPLE_ID | Identifier of the link for event subscription. |
| Requested MIH Event List | MIH_EVENT_LIST | List of MIH events that the endpoint would like to receive indications for, from the Event Source. |

7.4.4.2.2 Semantics of service primitive
The primitive parameters are as follows:
MIH_Event_Subscribe.confirm (
SourceIdentifier
LinkIdentifier,
ResponseMihEventList,
Status
)

| Name | Type | Description |
|---|---|---|
| Source Identifier | MIHF_ID | [Same as D5] |
| Link Identifier | LINK_TUPLE_ID | [Same as D5] |
| Response MIH Event List | MIH_EVENT_LIST | List of MIH events along with their subscription status |
| Status | STATUS | Status of operation. |

7.4.5.1.2 Semantics of service primitive
The primitive parameters are as follows:
MIH_Event_Unsubscribe.request (
DestinationIdentifier,
LinkIdentifier,
RequestedMihEventList
)

| Name | Type | Description |
|---|---|---|
| Destination Identifier | MIHF_ID | [Same as D5] |
| Link Identifier | LINK_TUPLE_ID | Identifier of the link for event unsubscription. |
| Requested MIH Event List | MIH_EVENT_LIST | List of MIH events for which indications need to be unsubscribed from the Event Source. |

7.4.5.2.2 Semantics of service primitive
The primitive parameters are as follows:
MIH_Event_Unsubscribe.confirm (
SourceIdentifier,
LinkIdentifier,
ResponseMihEventList,
Status
)

| Name | Type | Description |
| --- | --- | --- |
| Source Identifier | MIHF_ID | [Same as D5] |
| Link Identifier | LINK_TUPLE_ID | [Same as D5] |
| Response MIH Event List | MIH_EVENT_LIST | List of MIH events along with their unsubscription status. |
| Status | STATUS | Status of operation. |

7.4.10.1.2 Semantics of service primitive
The primitive parameters are as follows:
MIH_Link_Parameters_Report.indication (
SourceIdentifier,
LinkIdentifier,
LinkParametersStatusList
)

| Name | Type | Description |
| --- | --- | --- |
| Source Identifier | MIHF_ID | [Same as D5] |
| Link Identifier | LINK_TUPLE_ID | [Same as D5] |
| Link Parameters Status List | LIST(LINK_PARAM) | A list of Link Parameter Status. |

7.4.13.1.2 Semantics of service primitive
The primitive parameters are as follows:
MIH_Link_Handover_Imminent.indication (
SourceIdentifier,
Old Link Identifier,
New Link Identifier,
HO_Type,
MacOldAccessRouter,
MacNewAccessRouter
)

| Name | Type | Description |
| --- | --- | --- |
| Source Identifier | MIHF_ID | [Same as D5] |
| Old Link Identifier | LINK_TUPLE_ID | [Same as D5] |
| New Link Identifier | LINK_TUPLE_ID | [Same as D5] |
| HO_Type | HANDOVER_TYPE | Indicates whether intra-technology or inter-technology handover: |
| Mac Old Access Router | MAC_ADDRESS | [Same as D5] |
| Mac New Access Router | MAC_ADDRESS | [Same as D5] |

The primitive parameters are as follows:
MIH_Link_Handover_Complete.indication (
SourceIdentifier,
OldLinkIdentifier,
NewLinkIdentifier,
MacOldAccessRouter,
MacNewAccessRouter
)

| Name | Type | Description |
| --- | --- | --- |
| Source Identifier | MIHF_ID | [Same as D5] |
| Old Link Identifier | LINK_TUPLE_ID | [Same as D5] |
| New Link Identifier | LINK_TUPLE_ID | [Same as D5] |
| Mac Old Access Router | MAC_ADDRESS | [Same as D5] |
| Mac New Access Router | MAC_ADDRESS | [Same as D5] |

7.4.15.1.2 Semantics of the service primitive
The parameters of the primitive are as follows:
MIH_Get_Link_Parameters.request (
DestinationIdentifier,
LinkIdentifierList,
GetStatusRequestSet
)

| Name | Type | Description |
| --- | --- | --- |
| Destination Identifier | MIHF_ID | [Same as D5] |
| Link Identifier List | LIST(LINK_TUPLE_ID) | List of link identifiers for which status is requested. If the list is empty, return the status of all available links. |
| Get Status Request Set | LINK_STATUS_REQ | A type to represent a link status being requested. |

7.4.15.2.2 Semantics of the service primitive
The parameters of the primitive are as follows:
MIH_Get_Link_Parameters.confirm (
SourceIdentifier,
GetStatusResponseList,
Status
)

| Name | Type | Description |
| --- | --- | --- |
| Source Identifier | MIHF_ID | [Same as D5] |
| Get Status Response List | LIST(LINK_STATUS_RESP) | List of Status Responses. |
| Status | STATUS | Status of operation. |

7.4.16.1.2 Semantics of the service primitive
The parameters of the primitive are as follows:
MIH_Configure_Link.request (
DestinationIdentifier,
LinkIdentifier,
ConfigurationRequestsList
)

| Name | Type | Description |
| --- | --- | --- |
| Destination Identifier | MIHF_ID | [Same as D5] |
| Link Identifier | LINK_TUPLE_ID | [Same as D5] |
| Configuration Request List | LIST(LINK_CONFIG_REQ) | List of Configuration Requests. |

7.4.16.2.2 Semantics of the service primitive
The parameters of the primitive are as follows:
MIH_Configure_Link.confirm (
SourceIdentifier,
LinkIdentifier,
ConfigurationResponseList,
Status
)

| Name | Type | Description |
| --- | --- | --- |
| Source Identifier | MIHF_ID | [Same as D5] |
| Link Identifier | LINK_TUPLE_ID | [Same as D5] |
| Configuration Response List | LIST(LINK_CONFIG_STATUS) | A type to represent a link status being requested. |
| Status | STATUS | Status of operation. |

7.4.17.1.2 Semantics of the service primitive
The parameters of the primitive are as follows:
MIH_Scan.request (
DestinationIdentifier,
ScanLinkIdentifier
)

| Name | Type | Description |
| --- | --- | --- |
| Destination Identifier | MIHF_ID | [Same as D5] |
| Scan Link Identifier | LINK_ID | [Same as D5] |

7.4.17.2.2 Semantics of the service primitive
The parameters of the primitive are as follows:

MIH_Scan.confirm (
SourceIdentifier,
ScanLinkIdentifier,
ScanResponseSets,
Status
)

| Name | Type | Description |
| --- | --- | --- |
| Source Identifier | MIHF_ID | [Same as D5] |
| Scan Link Identifier | LINK_ID | [Same as D5] |
| Scan Response Sets | LIST(LINK_SCAN_RESP) | A list of discovered PoAs and related information. |
| Status | STATUS | Status of operation. |

7.4.18.1.2 Semantics of service primitive
The parameters of the primitive are as follows:
MIH_Net_HO_Candidate_Query.request (
DestinationIdentifier,
SuggestedNewLinkList,
HandoverMode,
OldLinkAction,
QueryResourceList
)

| Name | Type | Description |
| --- | --- | --- |
| Destination Identifier | MIHF_ID | [Same as D5] |
| Suggested New Link List | LIST(LINK_POA_LIST) | A list of PoAs for each link, suggesting the new access networks to which handover initiation should be considered. The access networks towards the top of the list are more preferable than those towards the bottom of the list. |
| Handover Mode | HANDOVER_MODE | The handover mode may influence the manner in which links are prepared for handover. |
| Old Link Actions | LINK_ACTIONS | Specifies the suggested action on link during handover. |
| Query Resource List | HANDOVER_QUERY_RESOURCE | TBD. |

7.4.18.2.2 Semantics of service primitive
The parameters of the primitive are as follows:
MIH_Net_HO_Candidate_Query.indication (
SourceIdentifier,
SuggestedNewLinkList,
HandoverMode,
OldLinkAction,
QueryResourceList
)

| Name | Type | Description |
| --- | --- | --- |
| Source Identifier | MIHF_ID | [Same as D5] |
| Suggested New Link List | LIST(LINK_POA_LIST) | A list of PoAs for each link, suggesting the new access networks to which handover initiation should be considered. The access networks towards the top of the list are more preferable than those towards the bottom of the list. |
| Handover Mode | HANDOVER_MODE | The handover mode may influence the manner in which links are prepared for handover. |
| Old Link Actions | LINK_ACTIONS | Specifies the suggested action on link during handover. |
| Query Resource List | HANDOVER_QUERY_RESOURCE | TBD. |

7.4.18.3.2 Semantics of service primitive
The parameters of the primitive are as follows:
MIH_Net_HO_Candidate_Query.response (
DestinationIdentifier,
CurrentLinkIdentifier,
HandoverAck,
PreferredLinkList,
RequestedResourceSet,
ErrorCode,
Status
)

| Name | Type | Description |
| --- | --- | --- |
| Destination Identifier | MIHF_ID | [Same as D5] |
| Current Link Identifier | LINK_TUPLE_ID | [Same as D5] |
| Handover Ack | HANDOVER_ACK | If the handover has to be aborted then a reason code is provided |
| Preferred Link List | LIST(LINK_POA_LIST) | A list of PoAs for each link, suggesting the new access networks to which handover initiation should be considered. This may be different than the networks that were suggested in the handover request. The list is sorted from most preferred first to least preferred last. |
| Requested Resource Set | LINK_RESOURCE_SET | [Same as D5] |
| Error Code | ERROR_CODE | [Same as D5] |
| Status | STATUS | Status of operation. |

7.4.18.4.2 Semantics of service primitive
The parameters of the primitive are as follows:
MIH_Net_HO_Candidate_Query.confirm (
SourceIdentifier,
CurrentLinkIdentifier,
HandoverAck,
PreferredLinkList,
RequestedResourceSet,
ErrorCode,
Status
)

| Name | Type | Description |
| --- | --- | --- |
| Source Identifier | MIHF_ID | [Same as D5] |
| Current Link Identifier | LINK_TUPLE_ID | [Same as D5] |
| Handover Ack | HANDOVER_ACK | If the handover has to be aborted then a reason code is provided |
| Preferred Link List | LIST(LINK_POA_LIST) | A list of PoAs for each link, suggesting the new access networks to which handover initiation should be considered. This may be different than the networks that were suggested in the handover request. The list is sorted from most preferred first to least preferred last. |
| Requested Resource Set | LINK_RESOURCE_SET | [Same as D5] |
| Error Code | ERROR_CODE | [Same as D5] |
| Status | STATUS | Status of operation. |

7.4.19.1.2 Semantics of service primitive
The parameters of the primitive are as follows:
MIH_MN_HO_Candidate_Query.request (
DestinationIdentifier,
CurrentLinkIdentifier,
CandidateLinkList,
QueryResourceList,
IPConfigurationMethod, -continued DHCPServerAddress,
FAAddress,
AccessRouterAddress
)

| Name | Type | Description |
|---|---|---|
| Destination Identifier | MIHF_ID | [Same as D5] |
| Current Link Identifier | LINK_TUPLE_ID | [Same as D5] |
| Preferred Link List | LIST(LINK_POA_LIST) | A list of PoAs for each link, identifying candidate networks to which handover needs to be initiated. The list is sorted from most preferred first to least preferred last. |
| Query Resource List | QUERY_RESOURCE_LIST | [Same as D5] |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |

7.4.19.2.2 Semantics of service primitive
The parameters of the primitive are as follows:
MIH_MN_HO_Candidate_Query.indication (
SourceIdentifier,
CurrentLinkIdentifier,
CandidateLinkList,
QueryResourceList,
IPConfigurationMethod,
DHCPServerAddress,
FAAddress,
AccessRouterAddress
)

| Name | Type | Description |
|---|---|---|
| Source Identifier | MIHF_ID | [Same as D5] |
| Current Link Identifier | LINK_TUPLE_ID | [Same as D5] |
| Candidate Link List | LIST(LINK_POA_LIST) | A list of PoAs for each link, identifying candidate networks to which handover needs to be initiated. The list is sorted from most preferred first to least preferred last. |
| Query Resource List | QUERY_RESOURCE_LIST | [Same as D5] |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |

7.4.19.3.2 Semantics of service primitive
The parameters of the primitive are as follows:
MIH_MN_HO_Candidate_Query.response (
DestinationIdentifier,
CurrentLinkIdentifier,
PreferredCandidateLinkList,
AvailableResourceSet,
IPConfigurationMethod,
DHCPServerAddress,
FAAddress,
AccessRouterAddress,
IPAddressInformationStatus,
Status
)

| Name | Type | Description |
|---|---|---|
| Destination Identifier | MIHF_ID | [Same as D5] |
| Current Link Identifier | LINK_TUPLE_ID | [Same as D5] |

-continued

| Name | Type | Description |
|---|---|---|
| Preferred Candidate Link List | LIST(LINK_POA_LIST) | A list of PoAs for each link, identifying candidate networks to which handover needs to be initiated. The list is sorted from most preferred first to least preferred last. |
| Available Resource Set | LIST(LINK_RESOURCE_SET) | A list of available resources for each link. |
| Query Resource List | QUERY_RESOURCE_LIST | [Same as D5] |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |
| IP Address Information Status | IP_CONFIG_STATUS | |
| Status | STATUS | Status of operation. |

7.4.19.4.2 Semantics of service primitive
The parameters of the primitive are as follows:
MIH_MN_HO_Candidate_Query.confirm (
SourceIdentifier,
CurrentLinkIdentifier,
PreferredCandidateLinkList,
AvailableResourceSet,
IPConfigurationMethod,
DHCPServerAddress,
FAAddress,
AccessRouterAddress,
IP Address Information Status,
Status
)

| Name | Type | Description |
|---|---|---|
| Source Identifier | MIHF_ID | [Same as D5] |
| Current Link Identifier | LINK_TUPLE_ID | [Same as D5] |
| Preferred Candidate Link List | LIST(LINK_POA_LIST) | A list of PoAs for each link, identifying candidate networks to which handover needs to be initiated. The list is sorted from most preferred first to least preferred last. |
| Available Resource Set | LIST(LINK_RESOURCE_SET) | A list of available resources for each link. |
| Query Resource List | QUERY_RESOURCE_LIST | [Same as D5] |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |
| IP Address Information Status | IP_CONFIG_STATUS | |
| Status | STATUS | Status of operation. |

7.4.20.1.2 Semantics of service primitive
The parameters of the primitive are as follows:
MIH_N2N_HO_Query_Resources.request (
DestinationIdentifier,
QueryResourceList,
IPConfigurationMethod,
DHCPServerAddress,
FAAddress,
AccessRouterAddress
)

| Name | Type | Description |
|---|---|---|
| Destination Identifier | MIHF_ID | [Same as D5] |
| Query Resource List | QUERY_RESOURCE_LIST | [Same as D5] |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |

7.4.20.2.2 Semantics of service primitive
The parameters of the primitive are as follows:
MIH_N2N_HO_Query_Resources.indication (
SourceIdentifier,
QueryResourceList,
IPConfigurationMethod,
DHCPServerAddress,
FAAddress,
AccessRouterAddress
)

| Name | Type | Description |
|---|---|---|
| Source Identifier | MIHF_ID | [Same as D5] |
| Query Resource List | QUERY_RESOURCE_LIST | [Same as D5] |
| IP Configuration Method | IP_CONFIG_METHODS | Current IP configuration |
| DHCP Server Address | IP_ADDRESS | method is included. [Same as D5] |
| FA Address | IP_ADDRESS | [Same as D5] |
| Access Router Address | IP_ADDRESS | [Same as D5] |

7.4.20.3.2 Semantics of service primitive
The parameters of the primitive are as follows:
MIH_N2N_HO_Query_Resources.response (
DestinationIdentifier,
ResourceStatus,
AvailableResourceSet,
IPConfigurationMethod,
DHCPServerAddress,
FAAddress,
AccessRouterAddress,
IPAddressInformationStatus,
Status
)

| Name | Type | Description |
|---|---|---|
| Destination Identifier | MIHF_ID | [Same as D5] |
| Resource Status | LINK_RESOURCE_STATUS | Specifies whether requested resources are available or not at the new PoA. |
| Available Resource Set | LIST(LINK_RESOURCE_SET) | A list of available resources for each link. |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |
| IP Address Information Status | IP_CONFIG_STATUS | |
| Status | STATUS | Status of operation. |

The parameters of the primitive are as follows:
MIH_N2N_HO_Query_Resources.confirm (
SourceIdentifier,
ResourceStatus,
AvailableResourceSet,
IPConfigurationMethod,
DHCPServerAddress,
FAAddress,
AccessRouterAddress,
IPAddressInformationStatus,
Status
)

| Name | Type | Description |
|---|---|---|
| Source Identifier | MIHF_ID | [Same as D5] |
| Resource Status | LINK_RESOURCE_STATUS | Specifies whether requested resources are available or not at the new PoA. |
| Available Resource Set | LIST(LINK_RESOURCE_SET) | A list of available resources for each link. |
| IP Configuration Method | IP_CONFIG_METHODS | Current IP configuration method is included. |
| DHCP Server Address | IP_ADDRESS | [Same as D5] |
| FA Address | IP_ADDRESS | [Same as D5] |
| Access Router Address | IP_ADDRESS | [Same as D5] |
| IP Address Information Status | IP_CONFIG_STATUS | |
| Status | STATUS | Status of operation. |

7.4.21.1.2 Semantics of service primitive
The parameters of the primitive are as follows:
MIH_Net_HO_Commit.request (
DestinationIdentifier,
HandoverCommitParameterList
)

| Name | Type | Description |
| --- | --- | --- |
| Destination Identifier | MIHF_ID | [Same as D5] |
| Handover Commit Parameter List | LIST(LINK_ACTION_REQ) | A list of handover action requests. |

7.4.21.2.2 Semantics of service primitive
The parameters of the primitive are as follows:
MIH_Net_HO_Commit.indication (
LinkActionSetList
)

| Name | Type | Description |
| --- | --- | --- |
| Source Identifier | MIHF_ID | [Same as D5] |
| Link Action Set List | LIST(LINK_ACTION_REQ) | A list of handover action requests. |

7.4.21.3.2 Semantics of service primitive
The parameters of the primitive are as follows:
MIH_Net_HO_Commit.response (
DestinationIdentifier,
LinkActionRespList,
Status
)

| Name | Type | Description |
| --- | --- | --- |
| Destination Identifier | MIHF_ID | [Same as D5] |
| Link Action Resp List | LIST(LINK_ACTION_RESP) | A list of handover action results. |
| Status | STATUS | Status of operation. |

7.4.21.4.2 Semantics of service primitive
The parameters of the primitive are as follows:
MIH_Net_HO_Commit.confirm (
SourceIdentifier,
HandoverResultParameterList,
Status
)

| Name | Type | Description |
| --- | --- | --- |
| Source Identifier | MIHF_ID | [Same as D5] |
| Handover Result Parameter List | LIST(LINK_ACTION_RESP) | A list of handover action results. |
| Status | STATUS | Status of operation. |

7.4.22.1.2 Semantics of service primitive
The parameters of the primitive are as follows:
MIH_MN_HO_Commit.request (
DestinationIdentifier,
CurrentLinkIdentifier,
TargetLinkIdentifier,
OldLinkActions
)

| Name | Type | Description |
| --- | --- | --- |
| Destination Identifier | MIHF_ID | [Same as D5] |
| Current Link Identifier | LINK_TUPLE_ID | [Same as D5] |
| Target Link Identifier | LINK_TUPLE_ID | [Same as D5] |
| Old Link Actions | LINK_ACTIONS | Specifies the suggested action on link during handover. |

7.4.22.2.2 Semantics of service primitive
The parameters of the primitive are as follows:
MIH_MN_HO_Commit.indication (
SourceIdentifier,
CurrentLinkIdentifier,
TargetLinkIdentifier,
OldLinkActions
)

| Name | Type | Description |
| --- | --- | --- |
| Source Identifier | MIHF_ID | [Same as D5] |
| Current Link Identifier | LINK_TUPLE_ID | [Same as D5] |
| Target Link Identifier | LINK_TUPLE_ID | [Same as D5] |
| Old Link Actions | LINK_ACTIONS | Specifies the suggested action on link during handover. |

7.4.22.3.2 Semantics of service primitive
The parameters of the primitive are as follows:
MIH_MN_HO_Commit.response (
DestinationIdentifier,
CurrentLinkIdentifier,
Status
)

| Name | Type | Description |
| --- | --- | --- |
| Destination Identifier | MIHF_ID | [Same as D5] |
| Current Link Identifier | LINK_TUPLE_ID | [Same as D5] |
| Status | STATUS | Status of operation. |

7.4.22.4.2 Semantics of service primitive
The parameters of the primitive are as follows:
MIH_MN_HO_Commit.confirm (
SourceIdentifier,
CurrentLinkIdentifier,
Status
)

| Name | Type | Description |
| --- | --- | --- |
| Source Identifier | MIHF_ID | [Same as D5] |
| Current Link Identifier | LINK_TUPLE_ID | [Same as D5] |
| Status | STATUS | Status of operation. |

The parameters of the primitive are as follows:
MIH_MN_HO_Complete.request (
DestinationIdentifier,
LinkIdentifier,
HandoverResult
)

| Name | Type | Description |
| --- | --- | --- |
| Destination Identifier | MIHF_ID | [Same as D5] |
| Link Identifier | LINK_TUPLE_ID | [Same as D5] |
| Handover Result | HANDOVER_RESULT | Handover result. |

7.4.23.2.2 Semantics of service primitive
The parameters of the primitive are as follows:
MIH_MN_HO_Complete.indication (
SourceIdentifier,
LinkIdentifier,
HandoverResult
)

| Name | Type | Description |
|---|---|---|
| Source Identifier | MIHF_ID | [Same as D5] |
| Link Identifier | LINK_TUPLE_ID | [Same as D5] |
| Handover Result | HANDOVER_RESULT | Handover result. |

7.4.23.3.2 Semantics of service primitive
The parameters of the primitive are as follows:
MIH_MN_HO_Complete.response (
DestinationIdentifier,
CurrentLinkIdentifier,
Status
)

| Name | Type | Description |
|---|---|---|
| Destination Identifier | MIHF_ID | [Same as D5] |
| Current Link Identifier | LINK_TUPLE_ID | [Same as D5] |
| Status | STATUS | Status of operation. |

7.4.23.4.2 Semantics of service primitive
The parameters of the primitive are as follows:
MIH_MN_HO_Complete.confirm (
SourceIdentifier,
CurrentLinkIdentifier,
Status
)

| Name | Type | Description |
|---|---|---|
| Source Identifier | MIHF_ID | [Same as D5] |
| Current Link Identifier | LINK_TUPLE_ID | [Same as D5] |
| Status | STATUS | Status of operation. |

7.4.24.1.2 Semantics of service primitive
The parameters of the primitive are as follows:
MIH_N2N_HO_Complete.request (
DestinationIdentifier,
CurrentLinkIdentifier,
HandoverResult
)

| Name | Type | Description |
|---|---|---|
| Destination Identifier | MIHF_ID | [Same as D5] |
| Link Identifier | LINK_TUPLE_ID | [Same as D5] |
| Handover Result | HANDOVER_RESULT | Handover result. |

7.4.24.2.2 Semantics of service primitive
The parameters of the primitive are as follows:
MIH_N2N_HO_Complete.indication(
SourceIdentifier,
CurrentLinkIdentifier,
HandoverResult
)

| Name | Type | Description |
|---|---|---|
| Source Identifier | MIHF_ID | [Same as D5] |
| Link Identifier | LINK_TUPLE_ID | [Same as D5] |
| Handover Result | HANDOVER_RESULT | Handover result. |

7.4.24.3.2 Semantics of service primitive
The parameters of the primitive are as follows:
MIH_N2N_HO_Complete.response (
DestinationIdentifier,
CurrentLinkIdentifier,
ResourceStatus,
Status
)

| Name | Type | Description |
|---|---|---|
| Destination Identifier | MIHF_ID | [Same as D5] |
| Current Link Identifier | LINK_TUPLE_ID | [Same as D5] |
| Resource Status | LINK_RESOURCE_RETENTION_STATUS | Status of resource. |
| Status | STATUS | Status of operation. |

7.4.24.4.2 Semantics of service primitive
The parameters of the primitive are as follows:
MIH_N2N_HO_Complete.confirm (
SourceIdentifier,
CurrentLinkIdentifier,
ResourceStatus,
Status
)

| Name | Type | Description |
|---|---|---|
| Source Identifier | MIHF_ID | [Same as D5] |
| Current Link Identifier | LINK_TUPLE_ID | [Same as D5] |
| Resource Status | LINK_RESOURCE_RETENTION_STATUS | Status of resource. |
| Status | STATUS | Status of operation. |

7.4.25.1.2 Semantics of service primitive
The parameters of the primitive are as follows:
MIH_Get_Information.request (
DestinationIdentifier,
InfoQueryBinaryDataList,
InfoQueryRDFDataList,
InfoQueryRDFSchemaURL,
InfoQueryRDFSchemaList,
MaxResponseSize
)

| Name | Type | Description |
|---|---|---|
| Destination Identifier | MIHF_ID | [Same as D5] |
| Info Query Binary Data List | LIST(INFO_QUERY_BINARY_DATA) | A list of binary queries. |
| Info Query RDFDataList | LIST(INFO_QUERY_RDF_DATA) | A list of RDF queries. |
| Info Query RDF Schema URL | NULL | An RDF Schema URL query. |
| Info Query RDF Schema List | LIST(INFO_QUERY_RDF_SCHEMA) | A list of RDF Schema queries. |
| Max Response Size | INTEGER(2) | [Same as D5] |

7.4.25.2.2 Semantics of service primitive
The parameters of the primitive are as follows:
MIH_Get_Information.indication (
SourceIdentifier,
InfoQueryBinaryDataList,
InfoQueryRDFDataList,
InfoQueryRDFSchemaURL,
InfoQueryRDFSchemaList,
MaxResponseSize
)

| Name | Type | Description |
|---|---|---|
| Source Identifier | MIHF_ID | [Same as D5] |
| Info Query Binary Data List | LIST(QUERY_BINARY_DATA) | A list of binary queries. |
| Info Query RDF Data List | LIST(INFO_QUERY_RDF_DATA) | A list of RDF queries. |
| Info Query RDF Schema URL | NULL | An RDF Schema URL query. |
| Info Query RDF Schema List | LIST(INFO_QUERY_RDF_SCHEMA) | A list of RDF Schema queries. |
| Max Response Size | INTEGER(2) | [Same as D5] |

7.4.25.3.2 Semantics of service primitive
The parameters of the primitive are as follows:
MIH_Get_Information.response (
DestinationIdentifier,
InfoRespBinaryDataList,
InfoRespRDFDataList,
InfoRespRDFSchemaURL,
InfoRespRDFSchemaList,
Status
)

| Name | Type | Description |
|---|---|---|
| Destination Identifier | MIHF_ID | [Same as D5] |
| Info Resp Binary Data List | LIST(INFO_RESP_BINARY_DATA) | A list of binary query responses. |
| Info Resp RDFDataList | LIST(INFO_RESP_RDF_DATA) | A list of RDF query responses. |
| Info Resp RDF Schema URL List | LIST(INFO_RESP_SCHEMA_URL) | A list of RDF Schema URL query responses. |
| Info Resp RDF Schema List | LIST(INFO_RESP_RDF_SCHEMA) | A list of RDF Schema query responses. |
| Status | STATUS | Status of operation. |

7.4.25.3.2 Semantics of service primitive
The parameters of the primitive are as follows:
MIH_Get_Information.confirm ( -continued

```
SourceIdentifier,
InfoRespBinaryDataList,
InfoRespRDFDataList,
InfoRespRDFSchemaURL,
InfoRespRDFSchemaList,
Status
)
```

| Name | Type | Description |
|---|---|---|
| Source Identifier | MIHF_ID | [Same as D5] |
| Info Resp Binary Data List | LIST(INFO_RESP_BINARY_DATA) | A list of binary query responses. |
| Info Resp RDFDataList | LIST(INFO_RESP_RDF_DATA) | A list of RDF query responses. |
| Info Resp RDF Schema URL List | LIST(INFO_RESP_SCHEMA_URL) | A list of RDF Schema URL query responses. |
| Info Resp RDF Schema List | LIST(INFO_RESP_RDF_SCHEMA) | A list of RDF Schema query responses. |
| Status | STATUS | Status of operation. |

7.6.1.1.2 Semantics
The primitive shall provide parameters as follows:
```
MIH_TP_Connect.request (
TransportType,
SourceAddress,
DestinationAddress
)
```

| Name | Type | Description |
|---|---|---|
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |

7.6.1.2.2 Semantics
The primitive shall provide parameters as follows:
```
MIH_TP_Connect.indication (
TransportType,
SourceAddress,
DestinationAddress
)
```

| Name | Type | Description |
|---|---|---|
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |

7.6.1.3.2 Semantics
The primitive shall provide parameters as follows:
```
MIH_TP_Connect.response (
TransportType,
SourceAddress,
DestinationAddress,
Status
)
```

| Name | Type | Description |
|---|---|---|
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Status | STATUS | Status of operation. |

7.6.1.4.2 Semantics
The primitive shall provide parameters as follows:
```
MIH_TP_Connect.confirm (
TransportType,
SourceAddress,
DestinationAddress,
Status
)
```

| Name | Type | Description |
|---|---|---|
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Status | STATUS | Status of operation. |

7.6.2.1.2 Semantics
The primitive shall provide parameters as follows:
```
MIH_TP_Disconnect.request (
TransportType,
SourceAddress,
DestinationAddress
)
```

| Name | Type | Description |
|---|---|---|
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |

7.6.2.2.2 Semantics
The primitive shall provide parameters as follows:
```
MIH_TP_Disconnect.indication (
TransportType,
SourceAddress,
DestinationAddress
)
```

| Name | Type | Description |
|---|---|---|
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |

7.6.3.1.2 Semantics
The primitive shall provide parameters as follows:
MIH_TP_Reset.request (
TransportType,
SourceAddress,
DestinationAddress
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |

7.6.3.2.2 Semantics
The primitive shall provide parameters as follows:
MIH_TP_Reset.indication (
TransportType,
SourceAddress,
DestinationAddress
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |

7.6.3.3.2 Semantics
The primitive shall provide parameters as follows:
MIH_TP_Reset.response (
TransportType,
SourceAddress,
DestinationAddress,
Status
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Status | STATUS | Status of operation. |

7.6.3.4.2 Semantics
The primitive shall provide parameters as follows:
MIH_TP_Reset.confirm (
TransportType,
SourceAddress,
DestinationAddress,
Status
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Status | STATUS | Status of operation. |

7.6.4.1.2 Semantics
The primitive shall provide parameters as follows:
The parameters of the primitive are as follows:
MIH_TP_Data.request (
TransportType,
SourceAddress,
DestinationAddress,
ReliableDeliveryFlag,
MIHProtocolPDU
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Reliable Delivery Flag | BOOLEAN | Indicate whether an acknowledgment is required. TRUE: Reliable delivery is required. FALUSE: Reliable delivery is not required. |
| MIH Protocol PDU | OCTET_STRING | [Same as D5] |

7.6.4.2.2 Semantics
The primitive shall provide parameters as follows:
The parameters of the primitive are as follows:
MIH_TP_Data.indication (
TransportType,
SourceAddress,
DestinationAddress,
ReliableDeliveryFlag,
MIHProtocolPDU
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Reliable Delivery Flag | BOOLEAN | Indicate whether an acknowledgment is required. TRUE: Reliable delivery is required. FALUSE: Reliable delivery is not required. |
| MIH Protocol PDU | OCTET_STRING | [Same as D5] |

7.6.4.3.2 Semantics
The primitive shall provide parameters as follows:
MIH_TP_Data.response (
TransportType,
SourceAddress,
DestinationAddress,
Status
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Status | STATUS | Status of operation. |

7.6.4.4.2 Semantics
The primitive shall provide parameters as follows:
MIH_TP_Data.confirm (
TransportType,
SourceAddress,
DestinationAddress,
Status
)

| Name | Type | Description |
| --- | --- | --- |
| Transport Type | TRANSPORT_TYPE | Identifies the protocol layer specific transport option. |
| Source Address | TRANSPORT_ADDRESS | [Same as D5] |
| Destination Address | TRANSPORT_ADDRESS | [Same as D5] |
| Status | STATUS | Status of operation. |

7.7.1.2.2 Semantics
The parameter of the primitive is as follows:
MIH_NMS_Initialize.confirm (
Status
)

| Name | Type | Description |
| --- | --- | --- |
| Status | STATUS | Status of operation. |

7.7.2.1.2 Semantics
The parameter of the primitive is as follows:
The parameter of the primitive is as follows:
MIH_NMS_Get_State.request (
StateInformationRequestList
)

| Name | Type | Description |
| --- | --- | --- |
| State Information Request List | LIST(MNS_STATE_REQ) | List of the state information to be queried. |

7.7.2.2.2 Semantics
The parameter of the primitive is as follows:
MIH_NMS_Get_State.confirm (
StateInformationResponseList,
Status
)

| Name | Type | Description |
| --- | --- | --- |
| State Information Response List | LIST(MNS_STATE_RESP) | A list of a pair of {state information; state information value}. |
| Status | STATUS | Status of operation. |

7.7.3.2.2 Semantics
The parameter of the primitive is as follows:
MIH_NMS_Reset.confirm (
Status
)

| Name | Type | Description |
| --- | --- | --- |
| Status | STATUS | Status of operation. |

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of employing an encoding scheme for media independent handover of a mobile node that is connected to a first access network during handover to a second heterogeneous access network, comprising:
a node receiving media independent handover protocol messages transmitted between a mobile node connected to the first access network and a media independent handover entity within a network node in said second heterogeneous network, wherein said first access network is one of an I.E.E.E. 802 network and a non-I.E.E.E. 802 network and said heterogeneous second access network is the other of an I.E.E.E. 802 network and a non-I.E.E.E. 802 network,
said media independent handover protocol messages having a field identifying a variable-length data type without a length value being included within said field identifying said variable-length data type,
said node determining length based on said variable-length data type identified in said field by selecting an encoding rule that corresponds to said identified variable-length data type from a set of a plurality of different encoding rules that each correspond to different variable-length data types, and
wherein said set of encoding rules that each correspond to different variable-length data types include encoding rules that correspond to data type categories, including general data types that are not derived from other data types and derived data types that are derived from said general data types, wherein an encoding rule corresponding to a derived data type is the same as the encoding rule corresponding to the basic data type from which the derived data type is derived.

2. The method of claim 1, wherein said media independent handover protocol messages are between nodes performing an 802.21 media independent handover.

3. The method of claim 2, wherein said data types are used to define 802.21 media independent handover information elements (IEs).

4. The method of claim 3, further including transmitting said TLVs from a mobile node.

5. The method of claim 2, wherein said data types are used to define type-length-value elements (TLVs).

6. The method of claim 2, wherein said data types are used to define primitives.

7. The method of claim 6, wherein said primitives are transmitted between different layers of a protocol stack within the same node.

8. The method of claim 1, wherein said node receiving media independent handover protocol messages transmitted between a mobile node connected to the first access network and a media independent handover entity within a network node is one of said mobile node and said network node.

9. The method of claim 1, wherein said encoding rule is a binary encoding rule and wherein said messages are I.E.E.E. 802.21 media independent handover (MIH) protocol messages transmitted from said mobile node to said network node or from said network node to said mobile node.

10. The method of claim 9, further including employing the following binary encoding rule related to a SEQUENCE data type:
  encoded in the order of appearance, where each data type is encoded using the encoding rule for the data type.

11. The method of claim 9, further including employing the following binary encoding rule related to a CHOICE data type:
  a one-octet selector field, followed by a variable length Value field, wherein a selector value determines the data type, and the Value field is encoded using the encoding the rule for the selected data type.

12. The method of claim 9, further including employing the following binary encoding rule related to a BITMAP data type: each bit of a BITMAP(N) value is encoded as an N/8-octet value in order of significance.

13. The method of claim 9, further including employing the following binary encoding rule related to a INTEGER data type: each octet of an INTEGER(N) value is encoded in network-byte order into an N-octet field.

14. The method of claim 9, further including employing the following binary encoding rule related to a CHAR data type: each character is encoded in order of appearance where each bit of each character is encoded in order of significance.

15. The method of claim 9, further including employing the following binary encoding rule related to a UNSIGNED INTEGER data type: each octet of an UNSIGNED_INTEGER(N) value is encoded in network-byte order into an N-octet field.

16. The method of claim 1, wherein said node identifies a first variable-length data type and applies a first encoding rule that corresponds to said first variable-length data type based on the identification of said first variable-length data type, and said node identifies a second different variable-length data type and applies a second different encoding rule that corresponds to said second variable-length data type based on the identification of said second variable-length data type.

17. A method of employing an encoding scheme for media independent handover of a mobile node that is connected to a first access network during handover to a second heterogeneous access network, comprising:
  a node receiving I.E.E.E. 802.21 media independent handover protocol messages transmitted between a mobile node connected to the first access network and a media independent handover entity within a network node in said second heterogeneous network, wherein said first access network is one of an I.E.E.E. 802 network and a non-I.E.E.E. 802 network and said heterogeneous second access network is the other of an I.E.E.E. 802 network and a non-I.E.E.E. 802 network,
  said I.E.E.E. 802.21 media independent handover protocol messages having omitted values for at least one of Type, Length and Value, and having a field identifying a variable-length data type without said omitted values for at least one of Type, Length and Value, wherein said variable-length data type is defined to determine said omitted values,
  said node determining the said omitted values based on said variable-length data type identified in said field by selecting an encoding rule that corresponds to said identified variable-length data type from a set of a plurality of different encoding rules that each correspond to different variable-length data types, and
  wherein said set of encoding rules that each correspond to different variable-length data types include encoding rules that correspond to data type categories, including general data types that are not derived from other data types and derived data types that are derived from said general data types, wherein an encoding rule corresponding to a derived data type is the same as the encoding rule corresponding to the basic data type from which the derived data type is derived.

18. The method of claim 17, further including using said data types to define media independent handover information elements (IEs), TLVs and primitives.

19. The method of claim 17, wherein said node identifies a first variable-length data type and applies a first encoding rule that corresponds to said first variable-length data type based on the identification of said first variable-length data type, and said node identifies a second different variable-length data type and applies a second different encoding rule that corresponds to said second variable-length data type based on the identification of said second variable-length data type.

* * * * *